(12) United States Patent
Matsumoto

(10) Patent No.: US 6,747,992 B1
(45) Date of Patent: Jun. 8, 2004

(54) COMMUNICATION SYSTEM AND COMMUNICATION METHOD

(75) Inventor: Wataru Matsumoto, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 0 days.

(21) Appl. No.: 09/560,297

(22) Filed: Apr. 27, 2000

Related U.S. Application Data

(63) Continuation of application No. PCT/JP99/02992, filed on Jun. 4, 1999.

(30) Foreign Application Priority Data

Oct. 8, 1998 (JP) ............................................. 10-286195

(51) Int. Cl.$^7$ .................................................. H04J 3/16
(52) U.S. Cl. ....................... 370/468; 370/465; 370/473; 370/493; 370/494; 370/495; 370/498
(58) Field of Search ................................. 370/345, 286, 370/289, 294, 348, 395.4, 437, 442, 443, 456, 459, 468, 528, 537, 329, 341, 352, 353, 354, 465, 473, 493, 494, 495, 498; 375/260, 265, 220, 240

(56) References Cited

U.S. PATENT DOCUMENTS

| | | | | |
|---|---|---|---|---|
| 5,493,567 A | | 2/1996 | Boyer et al. | |
| 5,561,466 A | * | 10/1996 | Kiriyama | |
| 5,666,487 A | * | 9/1997 | Goodman et al. | .......... 709/246 |
| 6,233,251 B1 | * | 5/2001 | Kurobe et al. | .............. 370/471 |
| 6,266,347 B1 | * | 7/2001 | Amran et al. | |
| 6,285,653 B1 | * | 9/2001 | Koeman et al. | ............ 370/201 |
| 6,317,495 B1 | * | 11/2001 | Gaikwad et al. | ............ 370/417 |
| 6,335,766 B1 | * | 1/2002 | Twitchell et al. | ........... 348/608 |
| 6,349,096 B1 | * | 2/2002 | Liu et al. | ..................... 370/352 |

OTHER PUBLICATIONS

G.lite Proposal for draft of Annex of G. lite, ITU–T, SG–15, pp 1–25 (1998).

* cited by examiner

*Primary Examiner*—Phirin Sam
(74) *Attorney, Agent, or Firm*—Birch, Stewart, Kolasch & Birch, LLP

(57) ABSTRACT

In the communication system, data transmission time suitable for data transmission and the quasi-data transmission time are set in one period in accordance with the transmission path, and first data and second data are transmitted in multiplexed fashion. Bits are assigned in such a manner that the first data of one period can be transmitted during the data transmission time for one period, and also in such a manner that the second data for a predetermined period can be transmitted in the portion not assigned the first data in the data transmission time for the particular predetermined period.

19 Claims, 20 Drawing Sheets

FIG.3

| $m_i$ | Parameter |
|---|---|
| $m_{47} - m_{44}$ | Minimum required SNR margin |
| $m_{43} - m_{18}$ | Reserved for future use |
| $m_{17}$ | trellis coding option |
| $m_{16}$ | echo cancelling option |
| $m_{15}$ | unused (shall be set to 1) |
| $m_{14}$ | Bitmap B mode |
| $m_{13} - m_{12}$ | Reserved for future use |
| $m_{11}$ | NTR |
| $m_{10} - m_9$ | Framing mode |
| $m_8 - m_6$ | Transmit PSD during initialization |
| $m_5 - m_4$ | Reserved |
| $m_3 - m_0$ | Maximum numbers of bits per sub-carrier supported |

FIG.4

| $m_i$ | Parameter |
|---|---|
| $m_{47} - m_{44}$ | Minimum required SNR margin |
| $m_{43} - m_{18}$ | Reserved for future use |
| $m_{17}$ | trellis coding option |
| $m_{16}$ | echo cancelling option |
| $m_{15}$ | unused (shall be set to 1) |
| $m_{14}$ | Bitmap B mode |
| $m_{13} - m_{12}$ | Low payload transfer delay mode |
| $m_{11}$ | NTR |
| $m_{10} - m_9$ | Framing mode |
| $m_8 - m_6$ | Transmit PSD during initialization |
| $m_5 - m_4$ | Reserved |
| $m_3 - m_0$ | Maximum numbers of bits per sub-carrier supported |

COMMUNICATION SYSTEM AND COMMUNICATION METHOD

This application is a continuation of International Application PCT/JP99/02992, with an international filing date of Jun. 4, 1999, which designated the United States, the entire contents of which are hereby incorporated by references.

TECHNICAL FIELD

The present invention relates to a communication system and a communication method for performing data communication of discrete multi-tone modem type, for example, between a plurality of data communication units through a telephone line.

BACKGROUND ART

In recent years, the xDSL communication system which uses the existing telephone copper cable, including the ADSL (Asymmetric Digital Subscriber Line) communication system, the HDSL (High-bit-rate Digital Subscriber Line) communication system and the SDSL communication system for performing a high-speed digital communication of several mega bits per second, have been closely watched. The xDSL communication system is called the DMT (Discrete Multi-Tone) modem system. This system is standardized in T1.413, etc. of ANSI.

This digital communication system, especially in the case where the xDSL transmission path and the ISDN transmission path of the half-duplex ISDN communication system are bound together as an aggregated line or otherwise placed adjacently to each other, poses the problem that the xDSL communication through the xDSL transmission path is affected by interference noises from the ISDN transmission path or other lines and decreases in speed. For solving this problem, various devices are introduced.

FIG. 14 shows the interference noises of an ISDN transmission path 2 from a central office (CO) 1, which affects an ADSL transmission path 3 constituting a xDSL transmission path bound with the ISDN transmission path 2 midway as an aggregated line.

When viewed from the ADSL terminal equipment (ATU-R; ADSL transceiver unit, remote terminal end) 4 constituting a communication unit at a terminal of the ADSL communication system, the interference noise transmitted through the ADSL transmission path 3 by the office equipment (ISDN LT) 7 of the ISDN transmission system is called the FEXT (far-end crosstalk) noise, while the interference noise transmitted through the ADSL transmission path 3 by the terminal equipment (ISDN NT1) 6 of the ISDN transmission system is called the NEXT (near-end crosstalk) noise. Especially, these noises are transmitted to the ADSL terminal equipment (ATU-R) 4 through the ADSL transmission path 3 which is coupled with the ISDN transmission path 2 midway as an aggregated line.

When viewed from the ADSL office equipment (ATU-C: ADSL transceiver unit, central office end) 5 constituting the office equipment of the ADSL communication system, on the other hand, the result is opposite from the case viewed from the ADSL terminal equipment (ATU-R) 4. In such a case, the interference noise transmitted by the office equipment (ISDN LT) 7 of the ISDN transmission system constitutes the NEXT noise, while the interference noise transmitted by the terminal equipment (ISDN NT1) 6 of the ISDN transmission system makes up the FEXT noise.

In an overseas ISDN communication system in U.S.A., for example, which is full-duplexed, the up and down transmissions are performed at the same time. When viewed from the ADSL terminal equipment (ATU-R) 4, therefore, the NEXT noise generated by the terminal equipment (ISDN NT1) 6 of the ISDN transmission system nearer to the ADSL terminal equipment (ATU-R) 4 is controlling, i.e. has a larger effect.

Therefore, during the training period of the ADSL modem (not shown) installed at the ADSL terminal equipment 4, the characteristic of the NEXT noise components having a large effect is measured, and the number of transmission bits and the gain of each channel meeting the noise characteristic are determined by bit mapping. Further, in order to improve the transmission characteristics, the coefficients of the time domain equalizer (TEQ) for adaptive equalization in time domain and the frequency domain equalizer (FEQ) for adaptive equalization in frequency domain are converged and determined, so that a set of coefficient tables for NEXT noises are provided for each of TEQ and FEQ.

Although this measure eliminates the problem in the aforementioned digital communication systems, the half-duplex communication system TCM-ISDN employed in Japan as an existing ISDN communication system, in which the up and down data transmission are switched by time division like Ping-Pong, poses the problem that in the case where the half-duplex transmission path and other transmission path are adjacently placed to each other on an aggregated line or the like, the NEXT noises and the FEXT noises from the half-duplex transmission path have an effect alternately on the communication terminals connected to the other transmission paths adjacent to the half-duplex transmission path.

In the Japanese ADSL system, therefore, a method is proposed in which the bit map is switched in accordance with the FEXT and NEXT sections of the TCM-ISDN interference noises ("G. lite: Proposal for draft of Annex of G. lite", ITU-T, SG-15, Waikiki, Hi. 29 June-3 July 1998, Temporary Document WH-047).

FIG. 15 shows an outline of a digital communication system using the digital communication equipment employing the method described above. In FIG. 15, numeral 11 designates a central office (CO) which controls the TCM-ISDN communication and the ADSL communication, numeral 12 designates a TCM-ISDN transmission path for the TCM-ISDN communication, numeral 13 designates an ADSL transmission path for the ADSL communication, numeral 14 designates an ADSL terminal equipment (ATU-R; ADSL transceiver unit, remote terminal end) such as a communication modem which performs the ADSL communication with other not shown ADSL communication terminal equipment through the ADSL transmission path 13, numeral 15 designates an ADSL office equipment (ATU-C; ADSL transceiver unit, central office end) which controls the ADSL communication within the central office 11, numeral 16 designates a TCM-ISDN terminal equipment (TCM-ISDN NT1) such as a communication modem which performs the TCM-ISDN communication with other not shown TCM-ISDN terminal equipment through the TCM-ISDN transmission path 12, numeral 17 designates a TCM-ISDN office equipment (TCM-ISDN LT) which controls the TCM-ISDN communication in the central office 11, and numeral 18 designates a sync controller which synchronizes the communication between the TCM-ISDN office equipment (TCM-ISDN LT) 17 and the ADSL office equipment (ATU-C) 15. The sync controller 18 may alternatively be installed in the TCM-ISDN office equipment (TCM-ISDN LT) 17 or the ADSL office equipment (ATU-C) 15.

As described above, when viewed from the ADSL terminal equipment (ATU-R) 14, as shown in FIG. 15, the interference noise transmitted by the TCM-ISDN office equipment (TCM-ISDN LT) 17 providing a far half-duplex communication system through the TCM-ISDN transmission path 12 and the ADSL transmission path 13 which are adjacent on an aggregated line is called the "FEXT noise", while the interference noise transmitted by the TCM-ISDN terminal equipment (TCM-ISDN NT1) 16 constituting a near half-duplex communication system through the TCM-ISDN transmission path 12 and the ADSL transmission path 13 which are adjacent on an aggregated line is called the "NEXT noise".

When viewed from the ADSL office equipment (ATU-C) 15, on the other hand, the case is opposite to the view from the ADSL terminal equipment (ATU-R) 14, and the interference noise transmitted by the office equipment (ISDN LT) 17 of the ISDN transmission system constituting the near half-duplex communication system is the NEXT noise, while the interference noise transmitted by the terminal equipment (ISDN NT1) 16 of the ISDN transmission system making up a far half-duplex communication system constitutes the FEXT noise.

FIG. 16 shows a functional configuration of a transmission unit or a dedicated transmitter (hereinafter referred to as the transmission system) such as a communication modem of the ADSL office equipment (ATU-C; ADSL transceiver unit, central office end) 15 of the digital communication system. On the other hand, FIG. 17 shows a functional configuration of a receiving unit or a dedicated receiver (hereinafter referred to as the receiving system) such as a communication modem of the ADSL terminal equipment (ATU-R) 14 of the digital communication system.

In FIG. 16, numeral 41 designates a multiplex/sync controller, numerals 42 and 43 designate cyclic redundancy check (crc) units, numerals 44 and 45 designate scramble forward error correction units (Scram & FEC), numeral 46 designates an interleaver, numerals 47 and 48 designate rate converters, numeral 49 designates a tone ordering unit, numeral 50 designates a constellation encoder and gain scaling unit, numeral 51 designates an inverse discrete Fourier transform unit (IDFT), numeral 52 designates an input parallel/serial buffer, and numeral 53 designates an analog processing and D/A converter (DAC).

In FIG. 17, numeral 141 designates an analog processing and A/D converter (ADC), numeral 142 designates a time domain equalizer (TEC), numeral 143 designates an input serial/parallel buffer, numeral 144 designates a discrete Fourier transform unit (DFT), numeral 145 designates a frequency domain equalizer (FEQ), numeral 146 designates a constellation encoder and gain scaling unit, numeral 147 designates a tone ordering unit, numerals 148, 149 designate rate converters, numeral 150 designates a deinterleaver, numerals 151, 152 designate descramble forward error correction units (FEC), numerals 153, 154 designate cyclic redundancy check units (crc), and numeral 155 designates a multiplex/sync controller.

Now, the operation will be explained. First, the reference is made to the operation of the transmission system of the ADSL office equipment (ATU-C) 15. In FIG. 16, the transmission data are multiplexed by the multiplex/sync controller 41, and have an error detection code added thereto by the cyclic redundancy check units 42, 43, have the FEC code added thereto and subjected to the scramble processing by the scramble forward error correction units 44, 45, sometimes followed by the processing in the interleaver 46. After that, the rate is converted by the rate converters 47, 48, the tone ordering is executed by the tone ordering unit 49, the constellation data are produced by the constellation encoder and gain scaling unit 50, the inverse discrete Fourier transform is carried out by the inverse discrete Fourier transform unit 51, the digital waveform is converted into an analog waveform through the analog processing and D/A converter 53, and then the signal is applied through a low-pass filter.

An explanation will be given of the operation of the receiving system of the ADSL terminal equipment (ATU-R) 14. In FIG. 17, the analog processing and A/D converter 141 applies the received signal through a low-pass filter, and converts the analog waveform into a digital waveform through the A/D converter, followed by the time domain adaptive equalization through a time domain equalizer (TEQ) 142.

Then, the data subjected to the time domain adaptive equalization are converted from serial to parallel data through the input serial/parallel buffer 143, subjected to the discrete Fourier transform in the discrete Fourier transform unit (DFT) 144, and then subjected to the frequency domain adaptive equalization by the frequency domain equalizer (FEQ) 145.

The constellation data are reproduced by the constellation encoder and gain scaling unit 146, converted into the serial data by the tone ordering unit 147, have the rate converted in the rate converters 148, 149, subjected to the descramble processing and FEC by the descramble and forward error correction unit 151, and in some cases, after being deinterleaved by the deinterleaver 150, subjected to FEC and descramble processing by the descramble and forward error correction unit 152. After the processing in the cyclic redundancy check unit 153, 154, the data are reproduced by the multiplex/sync controller 155.

In the process, the sync controller 18 of the central office (CO) 11 synchronizes the transmission timing between the TCM-ISDN office equipment (TCM-ISDN LT) 17 and the ADSL office equipment (ATU-C) 15. Thus, the ADSL terminal equipment (ATU-R) 14 can recognize the timing of generation of the NEXT noise and FEXT noise.

Specifically, the ADSL terminal equipment (ATU-R) 14, by the synchronization between the TCM-ISDN communication and the ADSL communication, determines that the NEXT noise is generated in the received data or the signal received through the ADSL transmission path 13 during a predetermined time when the data are transmitted up the TCM-ISDN transmission path 12 at a known timing. On the other hand, during a predetermined time when the data are transmitted down the TCM-ISDN transmission path 12 at a known timing, the generation of the FEXT can be similarly recognized in the data received through the ADSL transmission path 13.

In the Japanese ADSL system, as shown in FIG. 18, the bit map A and the bit map B are assigned to the FEXT sections and the NEXT sections, respectively, and in the rate converters 47, 48 of FIG. 16, the bit distribution is increased in FEXT section where there is a less noise, and the bit distribution is reduced in the NEXT section where there is a large noise. As a result, the transmission rate can be improved as compared with the conventional case in which the bit distribution is determined only by the NEXT section.

FIG. 19 shows the manner in which the data received at uniform rate (64 kbps in the calculation example below) are assigned to the bit map A and the bit map B at the time of transmission. First, the data sent in at uniform rate are stored in the form of fixed bits in units of symbols. These data are converted into bits for the bit map A and the bit map B by a rate converter. An integer multiple is not involved, however, because the interval of the transmitted symbols is 246 μs for the ISDN period of 2.5 ms.

Thus, as shown in FIG. 20, with 34 periods (=345 symbols, 85 ms) as one unit (hyperframe), only the FEXT section in the hyperframe where the symbols are filled up is defined as a bit map A, and the other portions as a bit map B (in the drawing, SS and ISS indicate sync signals). Whether each DMT symbol is associated with bit map A or bit map B is determined from the following equations. (In the equations below, the DMT symbol No. is assumed to be Ndmt)

Transmission from ATU-C to ATU-R $S = 272 \times Ndmt \bmod 2760$ if $\{(S+271<a)$ or $(S>a+b)\}$ then [bit map $A$ symbol]

if $\{(S+271>=a)$ and $(S<=a+b)\}$ then [bit map $B$ symbol]

where a=1243, and b=1461.

Transmission from ATU-R to ATU-C $S = 272 \times Ndmt \bmod 2760$ if $\{(S>a)$ and $(S+271<a+b)\}$ then [bit map $A$ symbol]

if $\{(S<32\ a)$ or $(S+271>32\ a+b)\}$ then [bit map $B$ symbol]

where a=1315, and b=1293.

An example of calculation for determining the bit assignment for the single bit map using only the bit map A to assign data is shown below.

Number of bits of 1 DMT symbol (before rate conversion)

=(transmission rate)×(transmission time)/(total number of symbols (except for ISS (inverse sync symbol) and SS (sync symbol))

=64 kbps×85 ms/340

=16 bits

Number of bits of bit map A

=(transmission rate)×(transmission time)/(total number of symbols of bit map $A$ (except for ISS (inverse sync symbol) and SS (side $A$ sync symbol))

=64 kbps×85 ms/126

=43.175

Thus, the bit map A is assumed to be equal to 44 bits. Further, because of the single bit map (using only the bit map A), the bit map B is set to zero bit.

The following is an example of calculation for determining the bit assignment for the dual bit map using both the bit map A and the bit map B.

Number of bits of 1 DMT symbol (before rate conversion)

=(transmission rate)×(transmission time)/(total number of symbols (except for ISS (inverse sync symbol) and SS (sync symbol))

=64 kbps×85 ms/340

=16 bits

This calculation example assumes that the number of bits of the bit map B is 3.

Number of bits of bit map A

=((transmission rate)×(transmission time) (number of bits per symbol of bit map $B$)×(number of symbols of bit map $B$ (except for ISS (inverse sync symbol) and SS (side $A$ sync symbol)))/ (number of symbols of bit map $A$ (except for ISS (inverse sync symbol) and SS (side $A$ sync symbol))

=(64 kbps×85 ms−3×214)/126

=38.079 bits

Thus, the bit map A has 39 bits.

When changing the bit distribution by a rate converter as described above, the data are output only after being stored to some degree in the rate converter at the transmitting or receiving end. Therefore a delay time occurs in the rate converter. Further, with a single bit map, the transmission data are assigned as fully in the bit map A as possible in each hyperframe. In some cases, therefore, the data of a given period may be assigned to the bit map A of a subsequent period. A further delay time is caused by such data. Even with a dual bit map, bits are assigned in the bit map A and the bit map B of the hyperframe as fully as possible. In some cases, therefore, the data of a given period may be assigned to a subsequent period, which causes an additional delay time for the particular data. In this conventional system, an excessively large delay is a problem.

Accordingly, the object of the present invention is to provide a communication system and a communication method capable of suppressing the delay.

DISCLOSURE OF THE INVENTION

According to one aspect of the present invention, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period not assigned the first data.

According to another aspect of the present invention, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data.

According to still another aspect of the present invention, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period which is not assigned the first data, such data are received of which the whole first data for one period are reproduced based on the first data assigned to the data transmission time for one period, and the whole second data for a predetermined period are reproduced based on the received second data assigned to the portion of the data transmission time of the predetermined period.

According to still another aspect of the present invention, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data, such data are received of which the whole first data for one period are reproduced based on the first data assigned to the data transmission time and the quasi-data transmission time for one period, and the whole second data for a predetermined period are reproduced based on the received second data assigned to the portion of the data transmission time and the quasi-data transmission time of the predetermined period.

According to still another aspect of the present invention, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period not assigned the first data.

According to still another aspect of the present invention, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data.

According to still another aspect of the present invention, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period which is not assigned the first data, such data are received of which the whole first data for one period are reproduced based on the first data assigned to the data transmission time for one period, and the whole second data for a predetermined period are reproduced based on the received second data assigned to the portion of the data transmission time of the predetermined period.

According to still another aspect of the present invention, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data, such data are received of which the whole first data for one period are reproduced based on the first data assigned to the data transmission time and the quasi-data transmission time for one period, and the whole second data for a predetermined period are reproduced based on the received second data assigned to the portion of the data transmission time and the quasi-data transmission time of the predetermined period.

BRIEF DESCRIPTION OF THE DRAWINGS

FIG. 3 is a diagram which explains a table delivered between the transmitting and receiving ends at the time of initialization of the conventional communication system, FIG. 4 is a diagram which explains a table delivered between the transmitting and receiving ends at the time of initialization of the communication system according to the present invention.

BEST MODE FOR CARRYING OUT THE INVENTION

For understanding the present invention in more detail, an explanation will be given with reference to the accompanying drawings.

In order to suppress the delay, bits are assigned in such a manner that the transmission data of one period can be transmitted during the data transmission time of the particular period. The bit assignment is conducted by rate converters 47, 48 shown in FIG. 16 like the conventional communication system.

Figure 1:
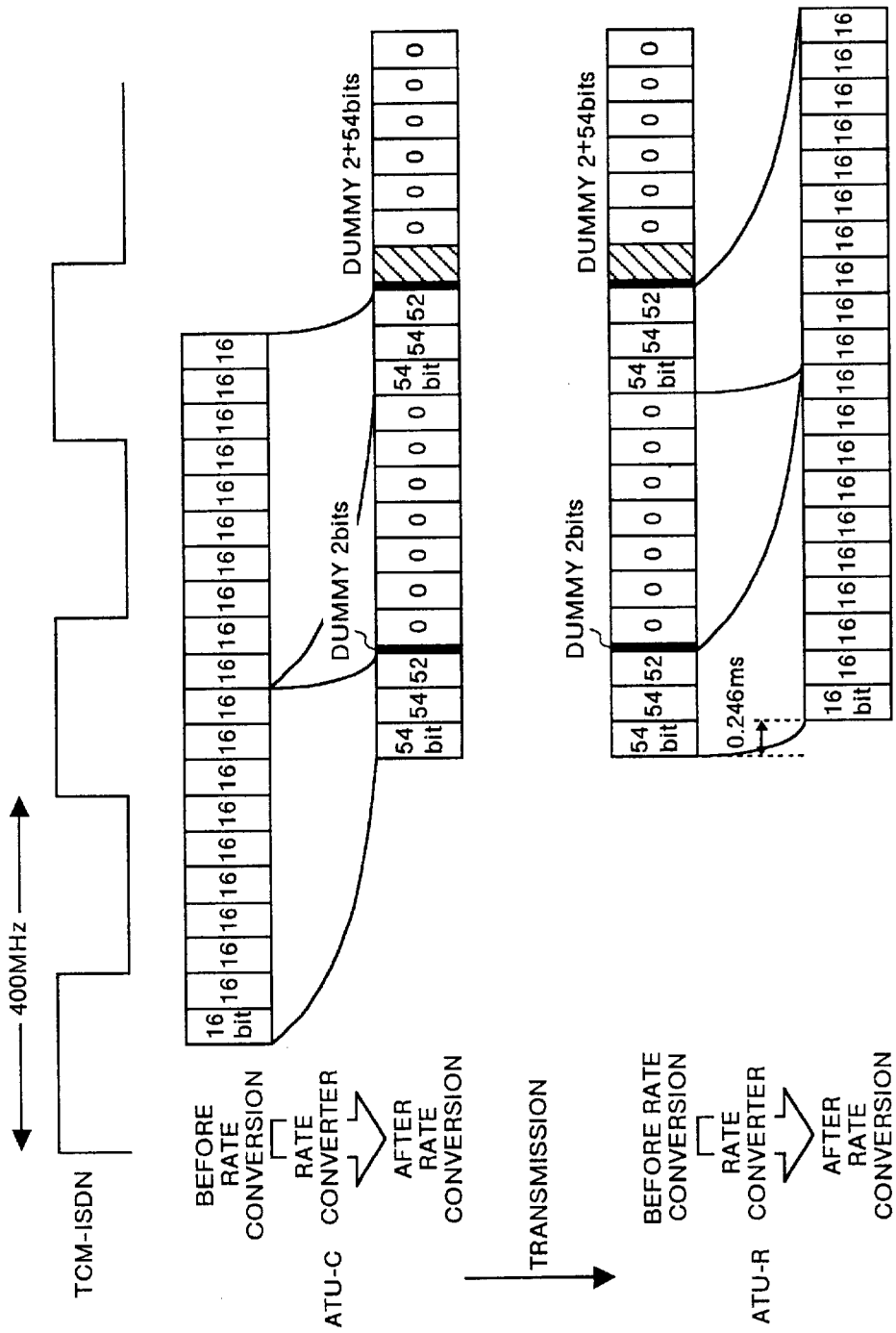
FIG. 1 is a diagram which explains the bit assignment of a communication system according to the present invention.

FIG. 1 shows an outline of the bit assignment. Bits are assigned in such a manner that uniform data of one period can all be transmitted during the data transmission time which is the time (corresponding to the FEXT section described above) suitable for data transmission in the particular period. Also, dummy data are assigned to the portion of the data transmission time to which the data could not be assigned.

Figure 20:
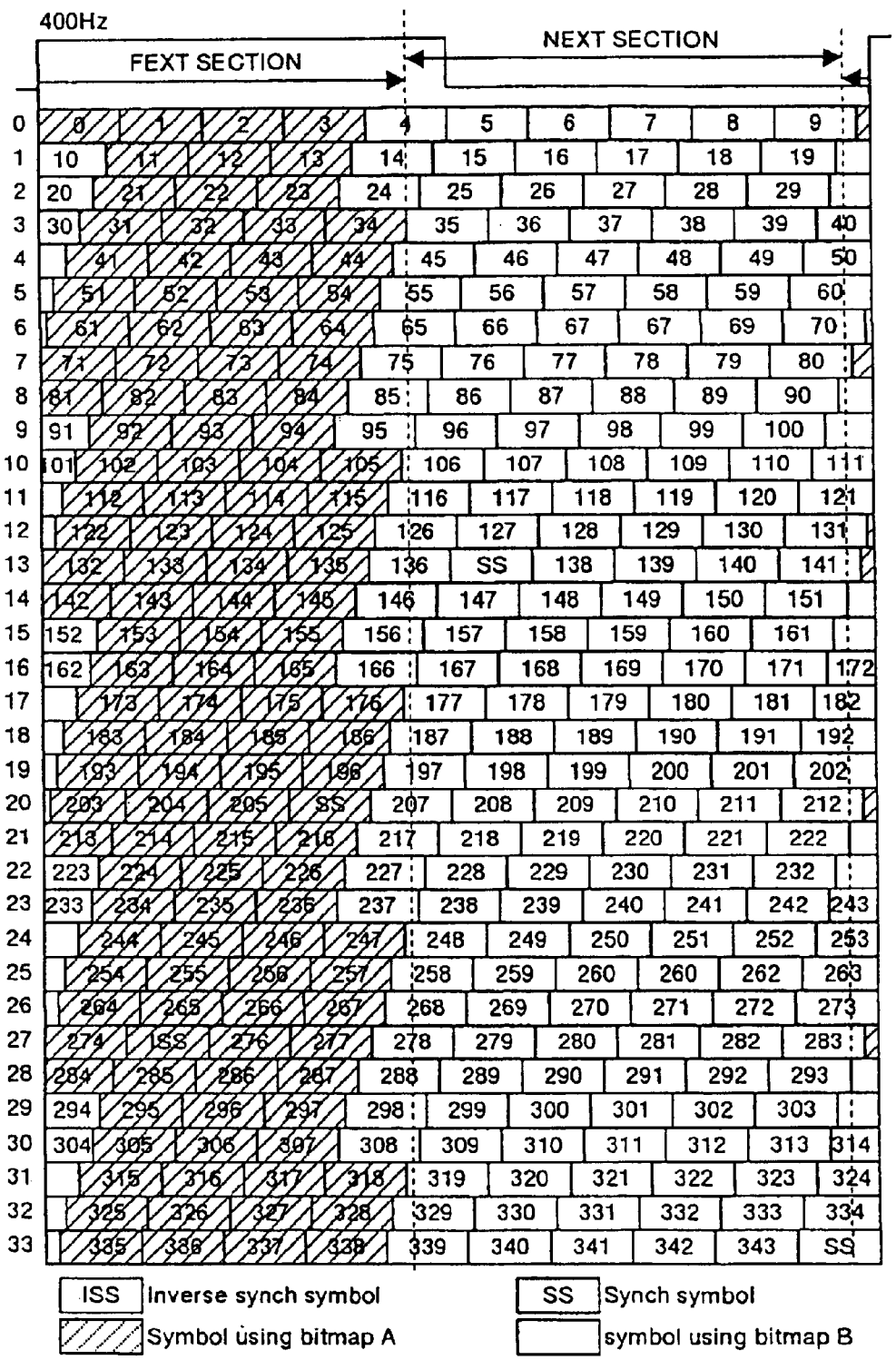
FIG. 20 is a diagram which explains the hyperframe structure.

Now, an example of calculation for determining the bit assignment will be explained with reference to the single bit map using only the bit map A. Bits are assigned, for example, in such a manner that one period (2.5 ms) of data, i.e. ten DMT symbols of data are inserted in three symbols of the bit map A (symbols that can be fully inserted in the data transmission time), and dummy bits are assigned to the bits, if any, remaining in the third symbol of the bit map A. Further, in the case where the bit map A has four successive symbols (0th period and 1st period in FIG. 20, for example), on the other hand, dummy bits are assigned to the entire fourth symbol of the bit map A.

Specifically, the number of bits of the bit map A is required to meet the following conditions.

(Number of bits of bit map $A$)×3≧(transmission rate in kbps)× (one period 2.5 ms).

The specifications for this bit assignment are as follows (an example of calculation of the bit assignment for the possible data transmission rate of 64 kbps for the ADSL transmission path as determined based on the S/N ratio measured during the training period as described above in the embodiment).

Number of bits of 1 DMT symbol (before rate conversion)

=(transmission rate)×(transmission time)/(total number of symbols (except for ISS (inverse sync symbol) and SS (sync symbol)))

=64 kbps×85 ms/340

=16 bits

Number of bits of bit map A

=(number of bits of 1 DMT symbol)×(ten DMT symbols)/(3 symbols)

=16×10/3

=53.33

Thus, the bit map A is equal to 54 bits.

Dummy bits for third bit map A in each period

=(number of bits of bit map $A$)×(3 symbols)−(number of bits for 1 DMT symbol)×(ten DMT symbols)

=54×3−16×10

=2 bits

In the presence of the fourth bit map A, dummy bits are used for all the transmission bits. Further, due to the single bit map (only the bit map A is used), the bit map B is set to zero bits.

Now, an example of calculation for determining the bit assignment for the dual bit map using both the bit map A and the bit map B is shown below. The bit assignment is conducted in the rate converters 47, 48 shown in FIG. 16 as in the conventional communication system.

Figure 2:
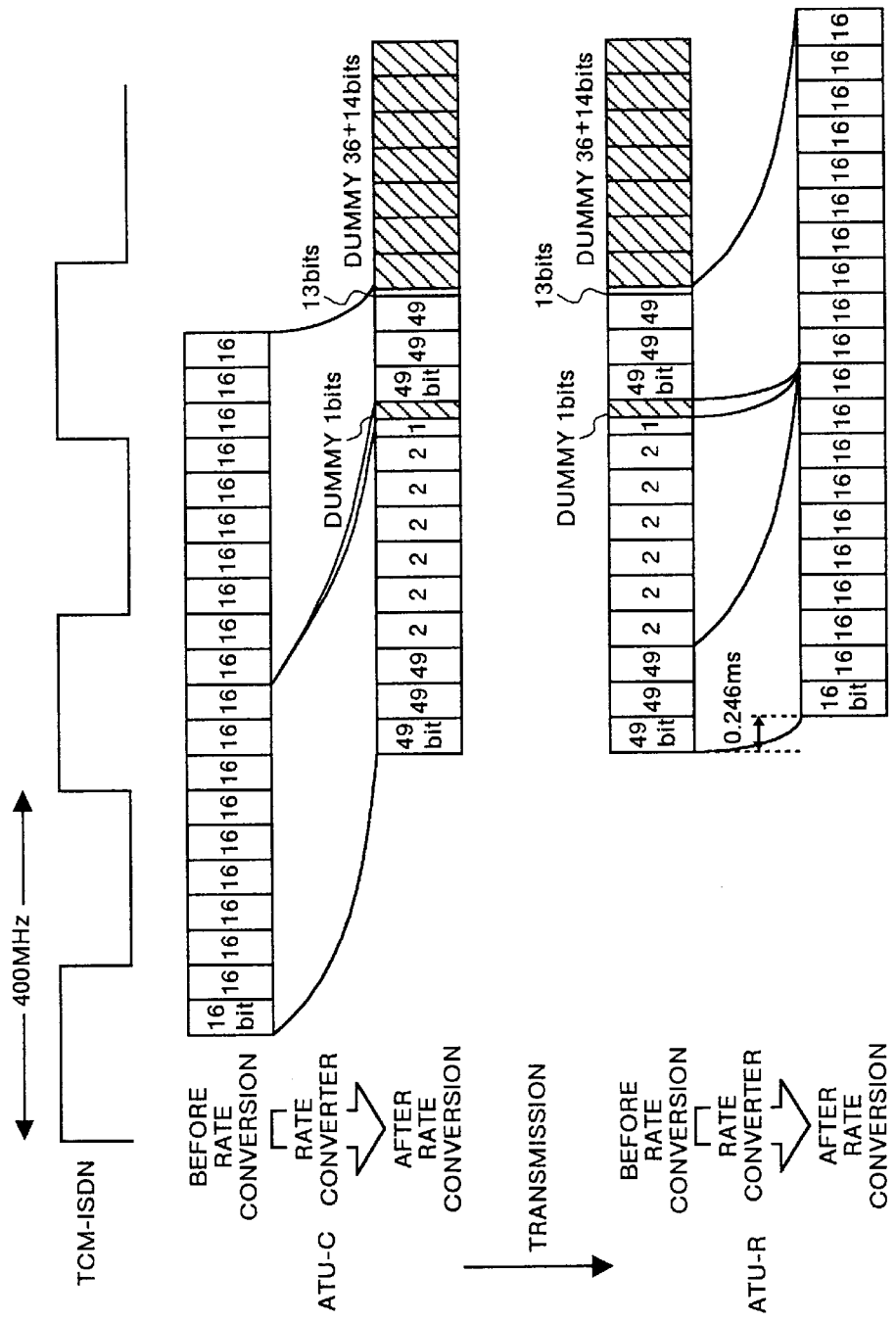
FIG. 2 is a diagram which explains the bit assignment of a communication system according to the present invention.

FIG. 2 shows an outline of the bit assignment according to this embodiment. In this case, in order to suppress the delay, bits for uniform data of one period are assigned to the data transmission time (for example, corresponding to the FEXT section described above) suitable for data transmission and the quasi-data transmission time (for example, corresponding to the NEXT section described above) other than the data transmission time within the particular period. Also, the portion of the data transmission time and the portion of the quasi-data transmission time not assigned the transmission data are assigned dummy data for transmission.

Bits are assigned in such a manner that the data of one period (2.5 ms), i.e. the data for ten DMT symbols (before rate conversion) are inserted in a unit of ten symbols (after rate conversion) including three symbols of the bit map A (symbols that can be fully inserted in the data transmission time) plus seven symbols of the bit map B (quasi-data transmission time) (except for ISS (inverse sync symbol) and SS (sync symbol)). Further, the portion not assigned the data in the bit map B is assigned dummy bits. Furthermore, in the case where the bit map A has four successive symbols, the fourth symbol of the bit map A is also assigned the transmission data in the same way that the bits are assigned for the bit map A described above, and the portion not assigned the data in the bit map A and the bit map B is assigned dummy bits. In the process, the delay amount can be reduced by minimizing the difference between the number of bits assigned to the bit map A and the number of bits assigned to the bit map B.

Specifically, the number of bits of the bit map A and the bit map B is required to meet the following conditions.

(number of bits of bit map $A$)×3+(number of bits of bit map $B$)×7≧(transmission rate in kbps)×(one period, 2.5 ms)

In order to reduce the delay time, the difference between the number of bits assigned to the bit map A and the number of bits assigned to the bit map B is minimized as much as possible (the delay time assumes the worst value for the minimum value of the bit map B).

The specifications for this bit assignment are as follows (An example of calculation of bit assignment for the transmissible data rate of 64 kbps of the ADSL transmission path as determined based on the S/N ratio measured during the training period as described above is shown in this embodiment).

Number of bits for 1 DMT symbol (before rate conversion)

=(transmission rate)×(transmission time)/(total number of symbols (except for ISS (inverse sync symbol) and SS (sync symbol))

=64 kbps×85 ms/340

=16 bits

This example of calculation assumes that the number of bits of the bit map B is two.
Number of bits of bit map A =((number of bits for 1 DMT symbol)×(ten DMT symbols) −(total number of bits for seven bit maps B))/(3 symbols)

=(16×10−2×7)/3

=48.67

Thus, the bit map A equals 49 bits.
Dummy bits for the tenth bit map B in unit of ten symbols (after rate conversion)

=(number of bits of bit map A)×(3 symbols)+(number of bits of bit map B)×(7 symbols)−(number of bits for 1 DMT symbol)× (ten DMT symbols)

=49×3+2×7−16×10

=1 bit

Although the delay time can be suppressed in the aforementioned bit assignment, the wasteful transmission of dummy bits deteriorates the transmission efficiency. In the case where the conventional single bit map is used at the data rate of 64 kbps, for example, the bit map A of 44 bits requires 54 bits in the bit assignment (hereinafter referred to as the low transmission delay mode) described above.

Figure 15:
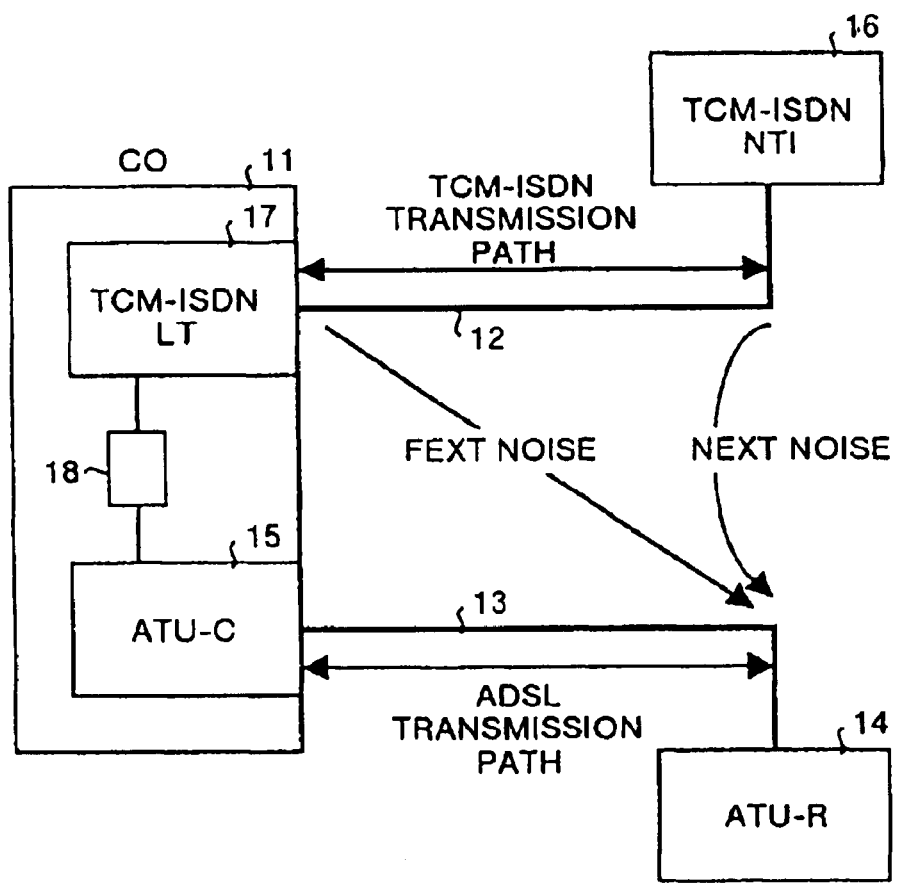
FIG. 15 is a diagram which explains the behavior of the interference noises between the transmission paths.

For transmitting all the bits of the bit map A as effective bits, for example, the data transmission capacity of 54 bits×126 (number of bit map A in hyperframe)/85 ms=80 kbps is required for the ADSL transmission path 13 (FIG. 15) in low transmission delay mode.

The actual effective transmission data contained in the data transmission capacity of about 80 kbps, however, is 64 kbps, and therefore, the transmission loss of 80 kbps−64 kbps=16 kbps occurs in the ADSL transmission path 13.

In the other mode than the low transmission delay mode (hereinafter referred to as the normal mode), on the other hand, the bit map A has 44 bits, and therefore the data transmission capacity of 44 bits×126 (number of bit map A in hyperframe)/85 ms=65 kbps is required. Therefore, the transmission loss will be 65 kbps−64 kbps=1 kbps.

Thus, the transmission loss is smaller than the figure for the low transmission delay mode.

As described above, the low transmission delay mode with a small delay is accompanied by a large transmission loss. Depending on the transmission data type, however, the reduction of the transmission loss may be desired in preference to suppressing the delay time.

In view of this, this invention efficiently transmits the data by combining the low transmission delay mode and the normal mode, when the data to be reduced in delay time and the data to be reduced in transmission loss are coexisting and then multiplexing these data. An embodiment will be explained below.

Figure 16:
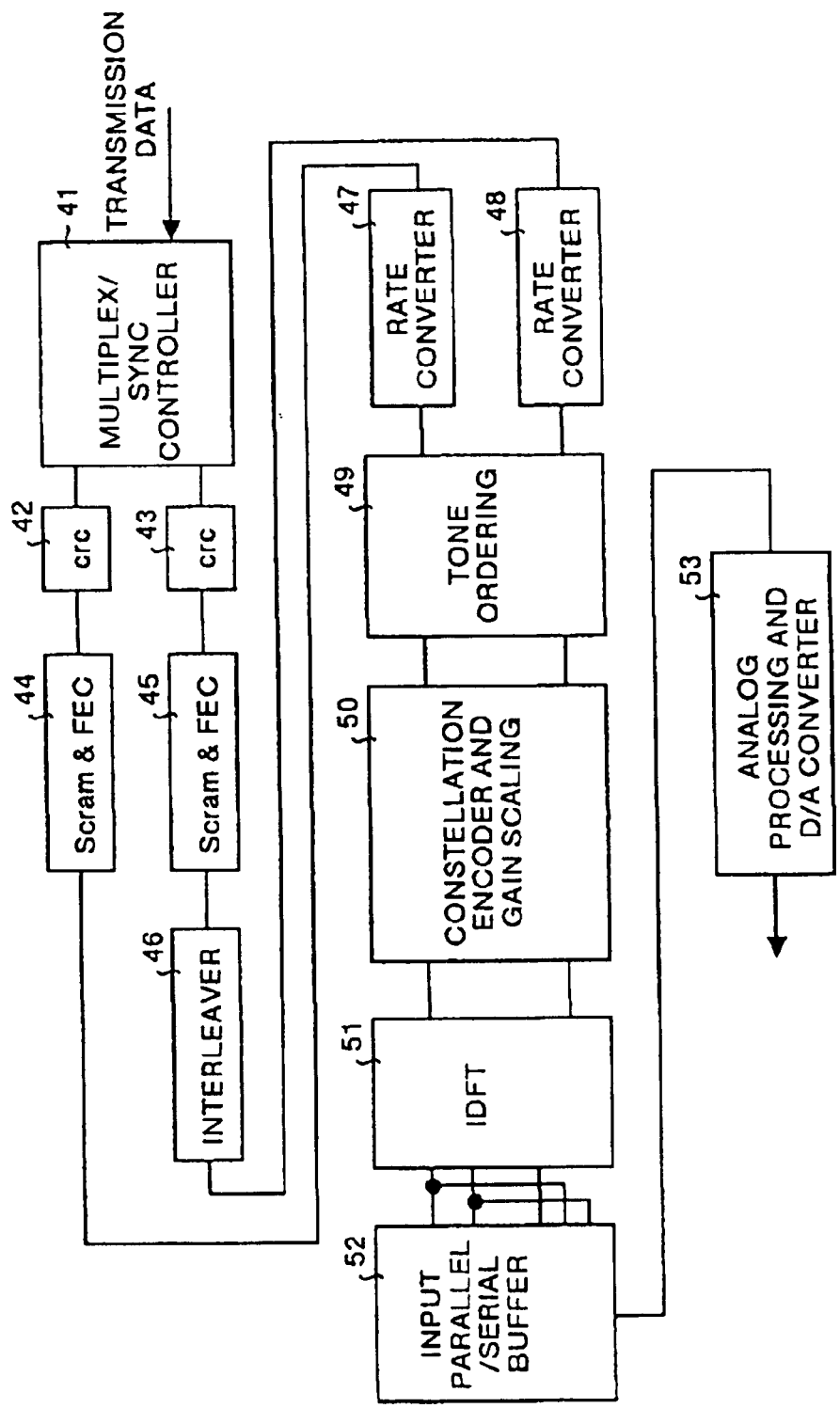
FIG. 16 is a configuration diagram showing the transmission function of the ADSL office equipment.
Figure 17:
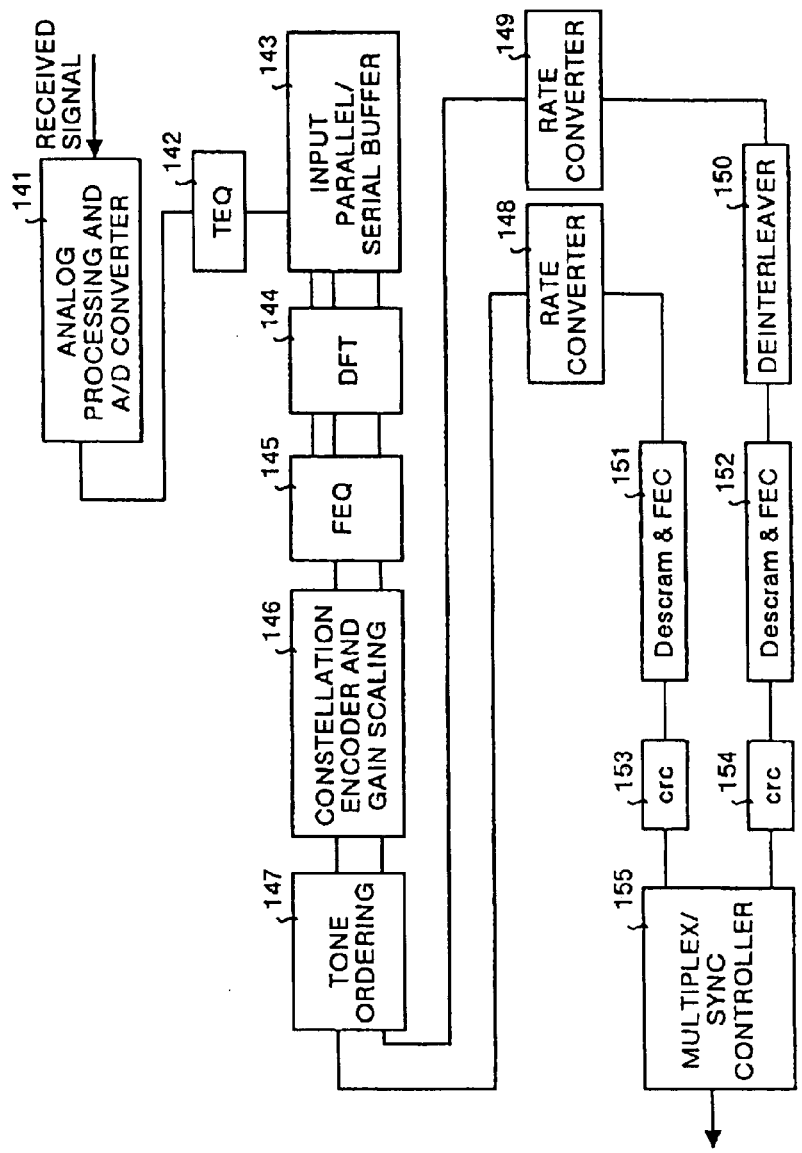
FIG. 17 is a configuration diagram showing the receiving function of the ADSL terminal equipment.
Figure 18:
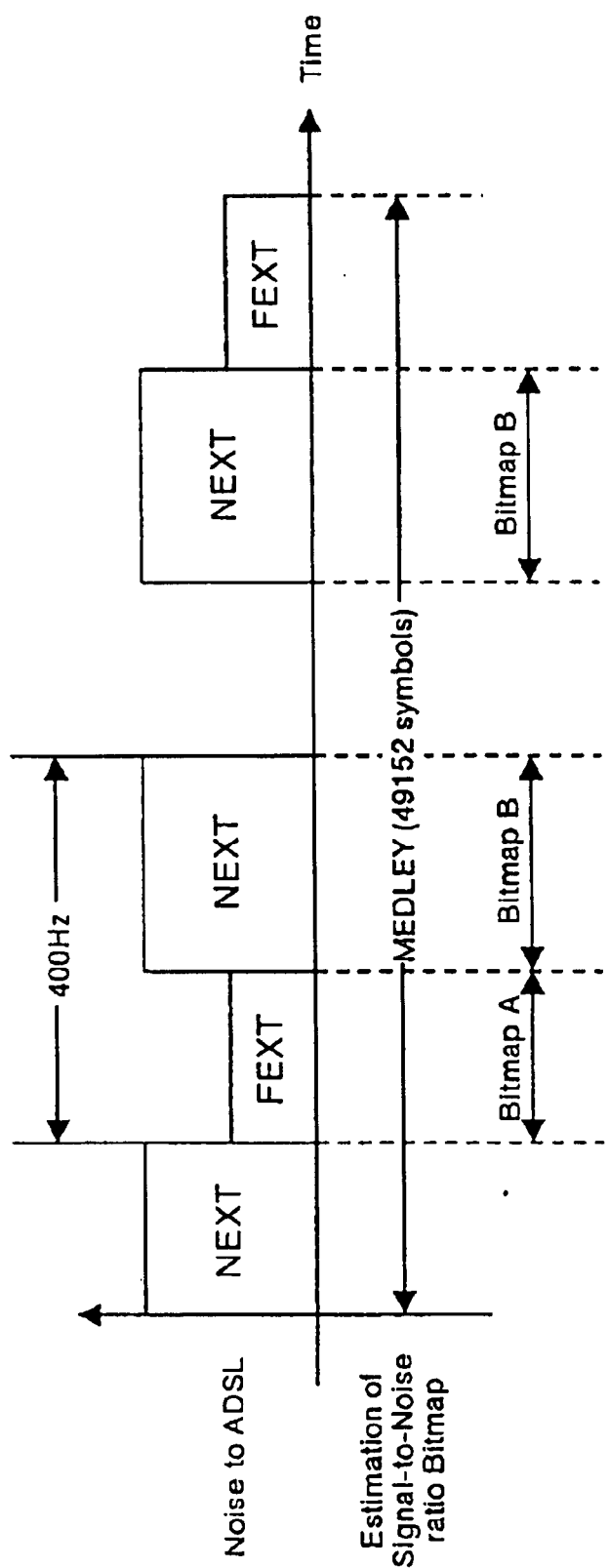
FIG. 18 is a diagram which explains the correspondence between the FEXT section and the NEXT section and the bit map.
Figure 19:
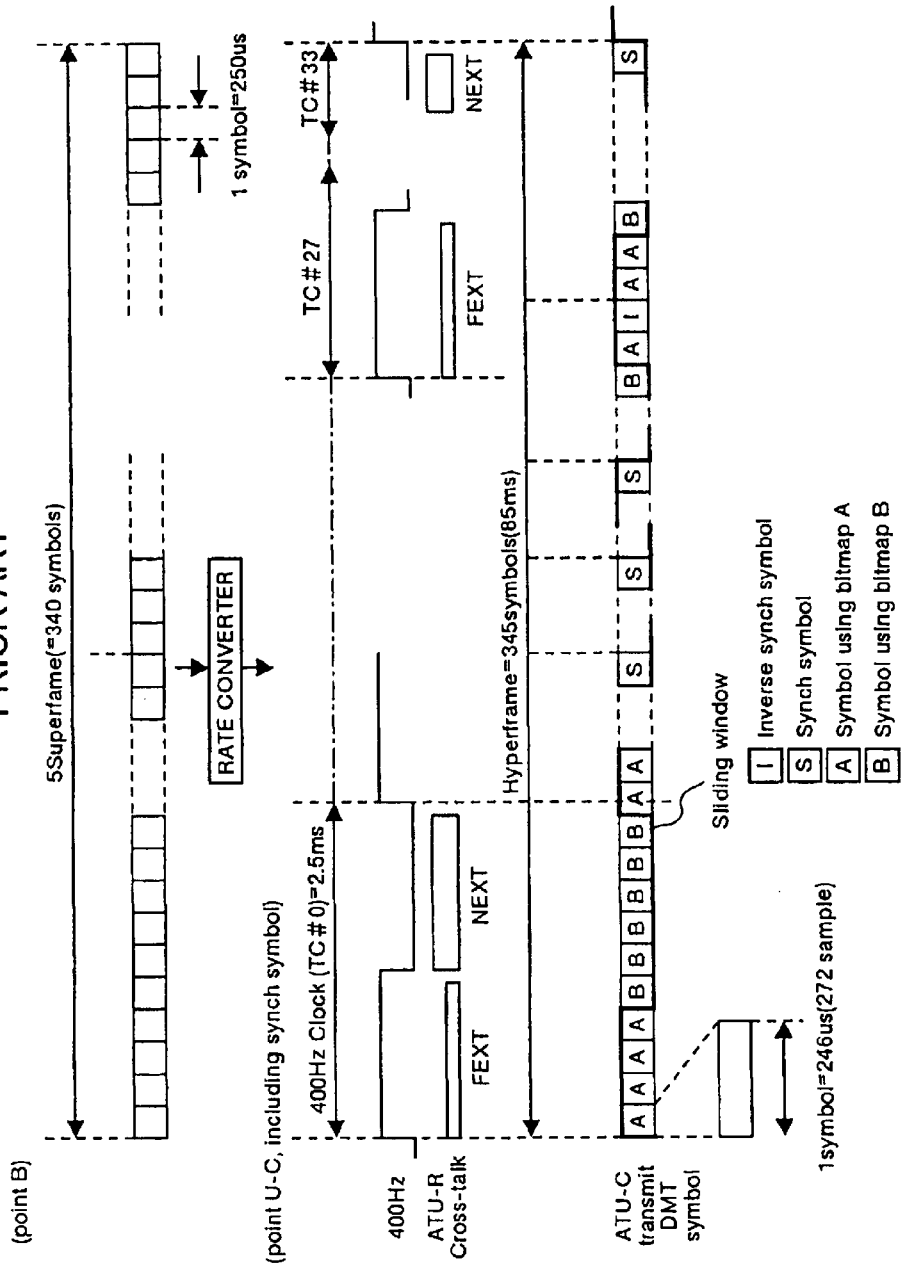
FIG. 19 is a diagram which explains the bit map assignment according to the prior art.

With the ADSL office equipment shown in FIG. 16 constituting the section of transmission to the ADSL terminal equipment, there are two routes available from the multiplex/sync controller 41 to the tone ordering unit 49. One is a interleaved data buffer route which includes the interleaver 46, and the other is a fast data buffer route which is not including the interleaver 46. The interleaved data buffer route for the interleave operation is accompanied by a longer delay. Similarly, the ADSL terminal equipment shown in FIG. 17 also has two routes. This configuration makes it possible to use the interleaved route and the non-interleaved route for different purposes.

First, the manner in which data are transmitted is determined by the initialization process. An example of a table transmitted for the initialization is shown in FIG. 3. In FIG. 3, $m_{12}$, $m_{13}$ are accompanied by the description "Reserved for future use". In this embodiment, however, this portion is used as a flag indicating which is selected, the low transmission delay mode or the normal mode, in the fast data buffer route and the interleaved data buffer route, as shown in FIG. 4. $m_{12}$, $m_{13}$ are defined as follows.

When $m_{12}=0$, the fast data buffer route is processed in normal mode.

When $m_{12}=1$, the fast data buffer route is processed in low transmission delay mode.

When $m_{13}=0$, the interleaved data buffer route is processed in normal mode.

When $m_{13}=1$, the interleaved data buffer route is processed in low transmission delay mode.

Figure 5:
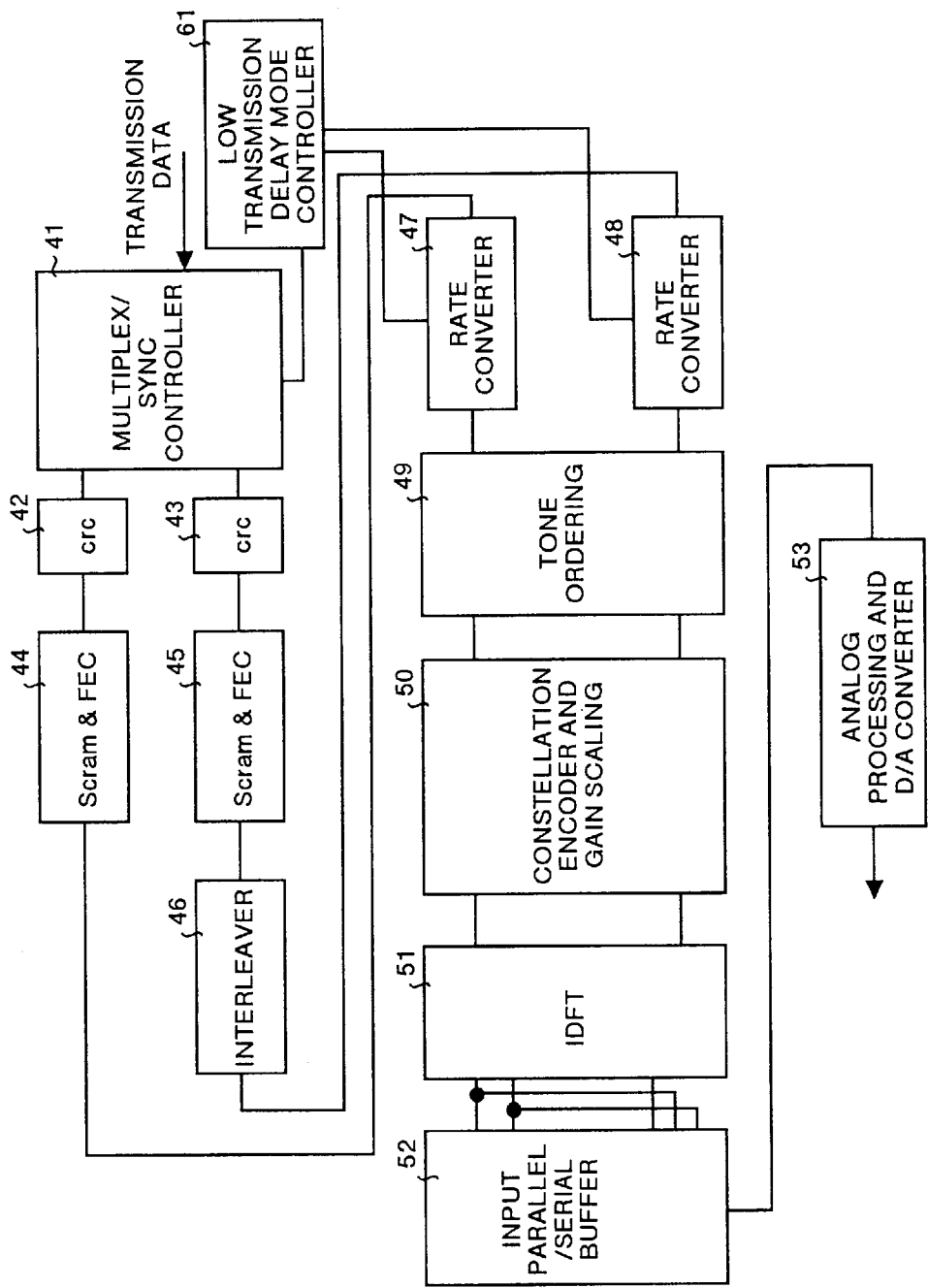
FIG. 5 is a configuration diagram showing the transmission function of the ADSL office equipment according to the present invention.
Figure 6:
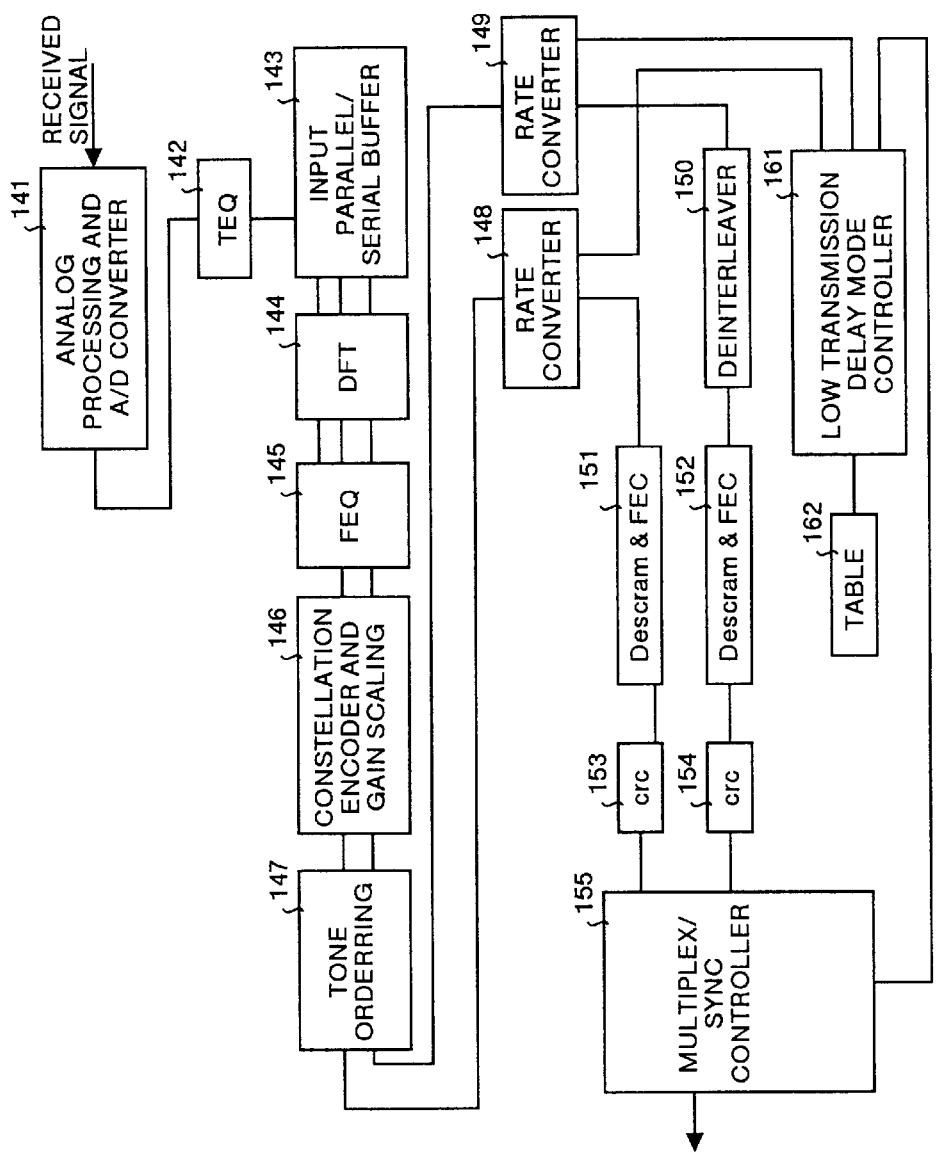
FIG. 6 is a configuration diagram showing the transmission function of the ADSL terminal equipment according to the present invention.

With reference to FIGS. 5 and 6, an explanation will be given of the operation performed in the case where a request is received from a high-level layer to transmit the audio data (first data) which need a reduced influence of transmission delay as much as possible through the fast data buffer route in low transmission delay mode and to transmit the Internet data (second data) that rates are valued more than the delay through the interleaved data buffer route in normal mode, for example. FIG. 5 is a diagram showing a functional configuration of the transmission system of the ADSL office equipment, and FIG. 6 is a diagram showing a functional configuration of the receiving system of the ADSL terminal equipment. In FIG. 5, numeral 61 designates a low transmission delay mode controller which controls the selection between the fast data buffer route and the interleaved data buffer route and between the low transmission delay mode and normal mode. In FIG. 6, numeral 161 designates a low transmission delay mode controller which controls the selection between the fast data buffer route and the interleaved data buffer route and the low transmission delay mode, and numeral 162 designates a table delivered between the transmitting and receiving ends for initialization.

As described above, when the ADSL office equipment 15 has received a request from a high-level layer to transmit the audio data through the fast data buffer route in low transmission delay mode and to transmit the Internet data through the interleaved buffer route in normal mode, the table as shown in FIG. 4 is transmitted to the ADSL terminal equipment 14 as $m_{12}=1$ and $m_{13}=0$ according to the initialization process. In this initialization process, the contents of the table transmitted are reflected in the table 162 (FIG. 6) of the ADSL terminal equipment 14.

Then, in the ADSL office equipment 15, the low transmission delay mode controller 61 (FIG. 5) controls the operation in such a manner as to transmit the audio data through the fast data buffer route and the Internet data through the interleaved data buffer route. Thus, the audio data is transmitted to the rate converter 47 through the cyclic redundancy check unit 42 and the scramble and forward error correction unit 44, while the Internet data is transmitted to the rate converter 48 through the cyclic redundancy check unit 43, the scramble and forward error correction unit 45 and the interleaver 46.

In the process, the low transmission delay mode controller 61 controls the rate converters 47, 48 in such a manner as to process the audio data in low transmission delay mode and the Internet data in normal mode. The rate converters 47, 48 are processed each data according to the control and transmitted. At the same time, the bit distribution is determined between the audio data (the first data) and the Internet data (the second data), after which the respective data are multiplexed in the tone ordering unit 49, and transmitted to the ADSL terminal equipment 16 through the analog processing and D/A converter 53 and the ADSL transmission path 13.

In the ADSL terminal equipment 14 that has received the audio data and the Internet data, on the other hand, the low transmission delay mode controller 161 performs the control operation, with reference to the table 162 (FIG. 6) reflecting the contents transmitted at the time of initialization, in such a manner as to transmit the audio data through the fast data buffer route and the Internet data through the interleaved data buffer route. Then, the audio data is transmitted to the rate converter 148 and the Internet data is transmitted to the rate converter 149, through the discrete Fourier transform unit 144, etc.

Because $m_{12}$ is set to 1 and $m_{13}$ is set to 0, the low transmission delay controller 161 controls the rate converters 148, 149 in such a manner as to process the audio data in low transmission delay mode and the Internet data in normal mode, and in accordance with this control operation, the rate converters 148, 149 process and transmit the respective data.

After that, the audio data is transmitted through the descramble and forward error correction unit 151, the cyclic redundancy check unit 153 and the multiplex/sync controller 155, while the Internet data is transmitted through the deinterleaver 150, the descramble and forward error correction unit 152, the cyclic redundancy check unit 154 and the multiplex/sync controller 155.

As described above, in the case where the audio data and the Internet data are transmitted in coexistence for communication, the audio data and the Internet data are each switched between the low transmission delay mode and the normal mode appropriately for bit distribution. By multiplexed transmission based on this bit distribution, the audio data can be transmitted by a communication method low in transmission delay, while the Internet data can be transmitted by a communication method low in transmission loss. In this way, the disadvantage of the transmission loss in low transmission delay mode can be suppressed to a minimum.

An example is shown below in which the transmission loss is compared between the case where all the data are transmitted in low transmission delay mode and the case where the low transmission delay mode and the normal mode are switched appropriately as described above. This example is associated with the single bit map.

For example, an ordinary home environment, where one ISDN telephone (audio data of 64 kbps) or equivalent and one Internet access unit (Internet data of 512 kbps) are used at the same time, is assumed.

Figure 7:
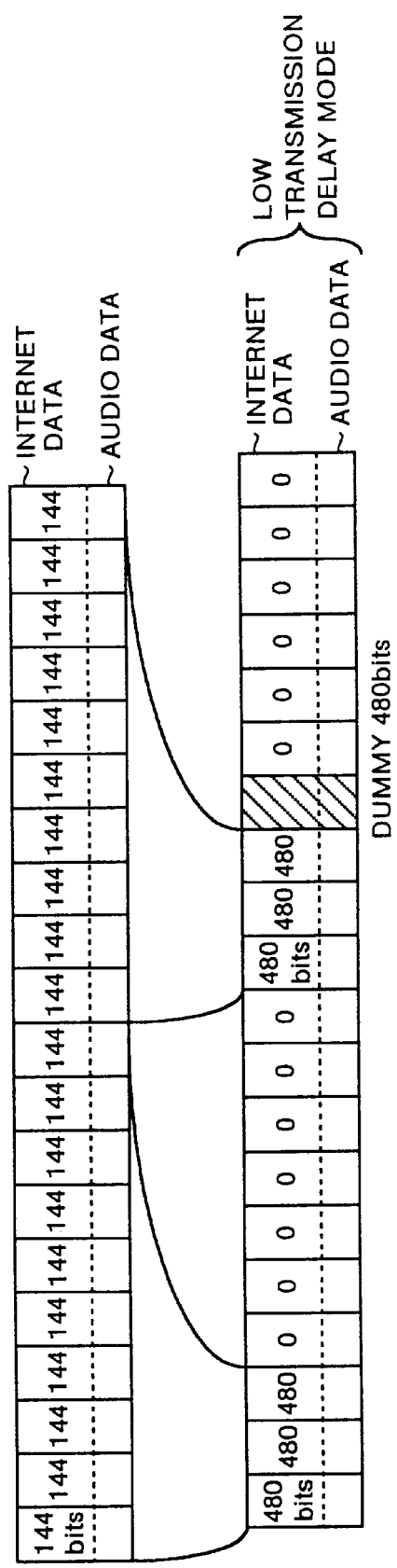
FIG. 7 is a diagram which explains the bit assignment of a communication system according to the present invention.

When all the transmission data of 576 kbps (audio data of 64 kbps plus Internet data of 512 kbps) is transmitted in low transmission delay mode, i.e. in the case where the data for a period is packed in the data transmission time of the particular period for both audio data and Internet data (see FIG. 7):

The number of bits of the ten DMT symbols before rate conversion will be 576 kbps×2.5 ms=1440 bits.

The number of bits of the bit map A in low transmission delay mode will be 1440 bits/3=480 bits.

In this case, the total number of bits of the hyperframe will be 480 bits×126=60480 bits.

The required data transmission capacity will be 60480 bits/85 ms=711.5 kbps.

Thus, the transmission loss will be 711.5 kbps−576 kbps=135.5 kbps.

The transmission loss in terms of the ratio to the entire transfer rate is expressed as 135.5 kbps/576 kbps=23.5%.

Figure 8:
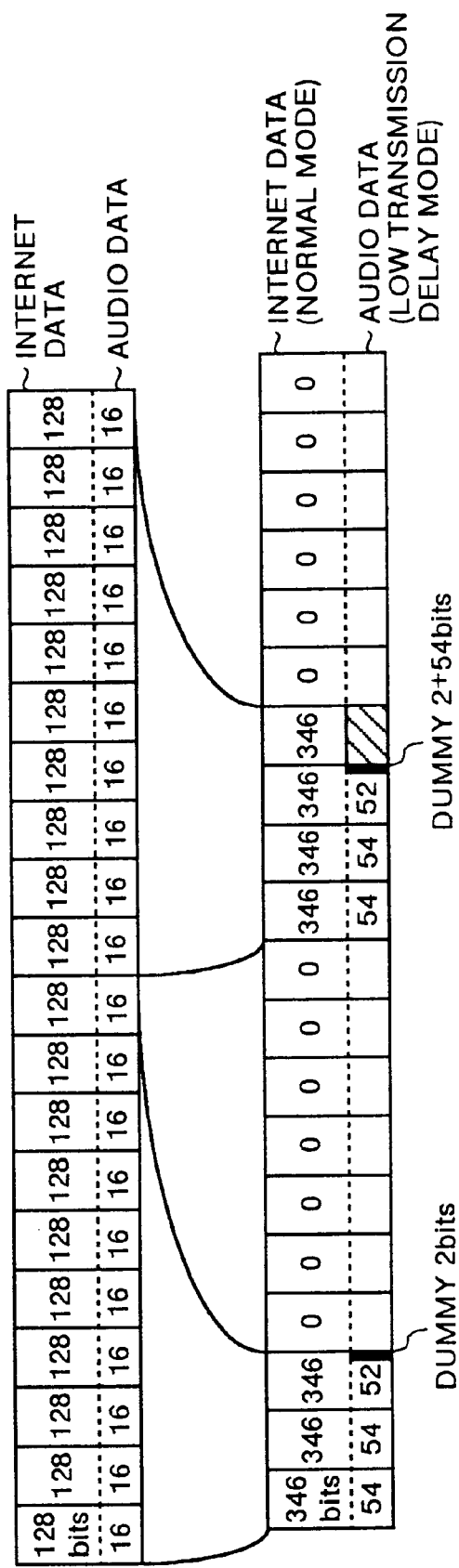
FIG. 8 is a diagram which explains the bit assignment of a communication system according to the present invention.

When the audio data of 64 kbps is transmitted in low transmission delay mode and the Internet data of 512 kbps in normal mode, i.e. when the whole audio data for one period is assigned to the data transmission time of the particular period, and the Internet data are assigned to that portion of the data transmission time of a hyperframe which is not assigned the audio data (see FIG. 8):

For transmitting all the bits of the bit map A (assumed to be 54 bits, for example, as determined in the above-mentioned embodiment) as effective bits, the data transmission capacity of 54 bits×126 (number of bit map A in hyperframe)/85 ms=80 kbps is required of the ADSL transmission path 13 in low transmission delay mode, of which the effective transmission data is actually 64 kbps, and therefore the transmission loss will be 80 kbps−64 kbps=16 kbps.

Thus, the transmission loss in terms of the ratio to the entire transfer rate is calculated as 16 kbps/(64 kbps+512 kbps)=3%.

It is thus seen that the ratio (=3%) of the transmission loss to the transfer rate of all the transmission data in the case where the low transmission delay mode and the normal mode are switched for use as according to the present invention described above is overwhelmingly less than the ratio (=23.5%) of the transmission loss in the case where all the data are transmitted in low transmission delay mode.

Now, an explanation will be given of an example in which the low transmission delay mode and the normal mode are combined and efficiently transmitted using the dual bit map in the case where the data to be reduced in delay time and the data to be reduced in transmission loss are coexisting. The operation is similar to the aforementioned case.

Figure 9:
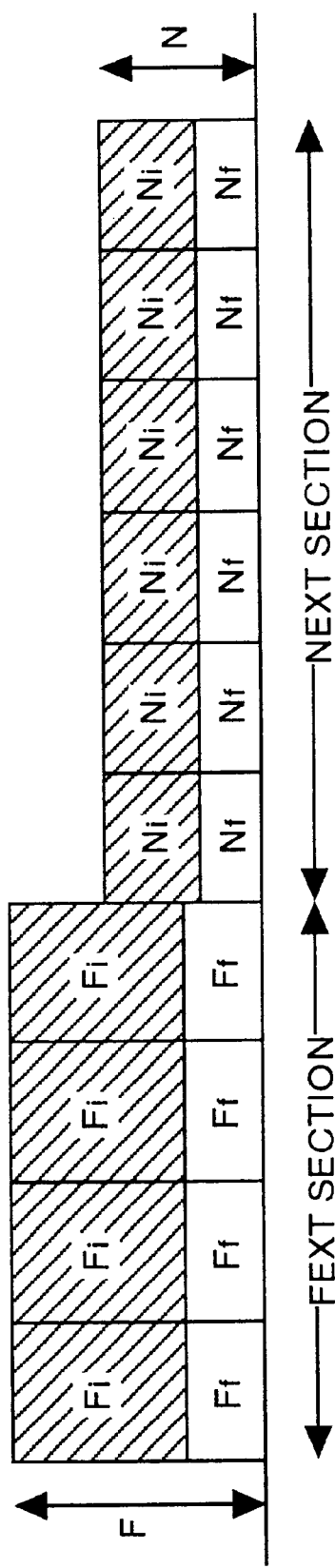
FIG. 9 is a diagram which explains the bit assignment for transmission in combined low delay transmission mode and normal mode.

An example of bit assignment for transmission in combined low transmission delay mode and normal mode using the dual bit map is shown in FIG. 9. The example of FIG. 9 represents the case in which the audio data is transmitted through the fast data buffer route in low transmission delay mode and the Internet data is transmitted through the interleaved data buffer route in normal mode. In FIG. 9, F designates the maximum number of bits that can be assumed in the FEXT section and N designates the maximum number of bits that can be assumed in the NEXT section. As described above, these numbers of bits are determined based on the S/N ratio measured during the training period. Further, $F_i$ designates the number of bits per symbol in the FEXT section of the data using the interleaved data buffer route, $F_f$ designates the number of bits per symbol in the FEXT section using the fast data buffer route, $N_i$ designates the number of bits per symbol in the NEXT section using the interleaved data buffer route and $N_f$ designates the number of bits per symbol in the NEXT section using the fast data buffer route. The number of bits per symbol of the data using the fast data buffer route before rate conversion is given as $R_F$.

The audio data which need the influence of the transmission delay as much as possible is transmitted in low transmission delay mode in which the data for the whole period is assigned to the data transmission time of the particular period for suppressing the delay. In the case where the dual bit map is used, it is also possible to assign the bits to the bit map B. Therefore, the audio data are transmitted at the same data rate as the data rate before rate conversion. As a result, the wasteful dummy bits are not generated.

In the case where the maximum number of bits that can be as signed in the NEXT section (the number of bits assigned to the bit map B) is decreased to such an extent that the same number of bits as the number of bits per symbol of the audio data before rate conversion cannot be assigned to the bit map B, the audio data of ten symbols are assigned in such a manner that three symbols of data are transmitted as the bit map A and seven symbols of data are transmitted as the bit map B. Then, the portion of the bit map B where the data are not assigned is assigned dummy bits. Further, in the case where four symbols of bit map A successively exist, the fourth symbol of the bit map A is assigned the audio data in the same ratio as in the bit map A, and the dummy bits are assigned in the portion of the bit map A and the bit map B where data was not assigned.

The Internet data, on the other hand, are transmitted by being assigned to the portion where the audio data are not assigned in normal mode.

An example of calculation of each of the cases described above will be explained below.

Figure 10:
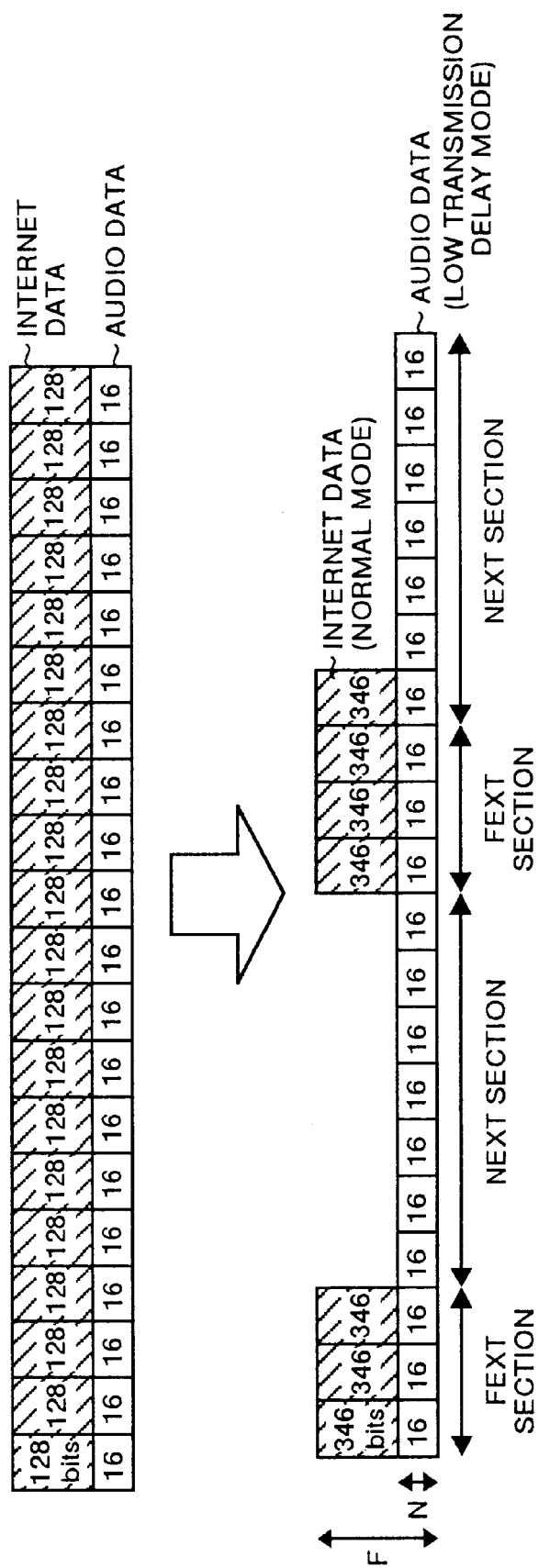
FIG. 10 is a diagram which explains the bit assignment of a communication system according to the present invention.

In the case where (number $R_F$ of bits per symbol of the data using the fast data buffer route before rate conversion)= (maximum number N of bits that can be assumed in NEXT section) (see FIG. 10)

The maximum number F of bits that can be assumed in the FEXT section determined based on the S/N ratio measured during the training period is 384 bits, and the maximum number N of bits that can be assumed during the NEXT section is 16 bits. An explanation will be given below of an example of calculation in the case where the audio data of 64 kbps (corresponding to one telephone set of ISDN, for example) is transmitted through the fast data buffer route in low transmission delay mode, and the Internet data of 512 kbps (corresponding to one Internet access unit, for example) is transmitted through the interleaved data buffer route in normal mode.

(Number $R_F$ of bits per symbol of data using the fast data buffer route before rate conversion)

=(transmission rate)×(transmission time)/(total number of symbols, (except for ISS (inverse sync symbol) and SS (sync symbol))

=64 kbps×85 ms/340

=16 bits

Since the maximum number N of bits that can be assumed in the NEXT section is 16 bits, then $R_F$=N, and therefore, $F_f$=$N_f$=$R_F$ is satisfied. As a result, the audio data using the fast data buffer route can be transmitted at uniform rate, so that the delay can be suppressed and the transmission loss is avoided.

Since all the bit map B are assigned to the audio data using the fast data buffer route, the Internet data using the interleaved data buffer route is assigned to the unused portion of the bit map A.

(Unused portion of bit map A)

=(maximum number F of bits that can be assumed in FEXT section)−(number $F_f$ of bits per symbol in FEXT section of data using fast data buffer route)

=384−16

=368 bits

On the other hand, the number of bits required for transmitting the Internet data through the interleaved data buffer route using only the bit map A is as follows.
(Number of bits required for transmitting Internet data through interleaved data buffer route using only bit map A)

=(transmission rate)×(transmission time)/(number of symbols of bit map A)

=512×85/126

=346 bits

Figure 11:
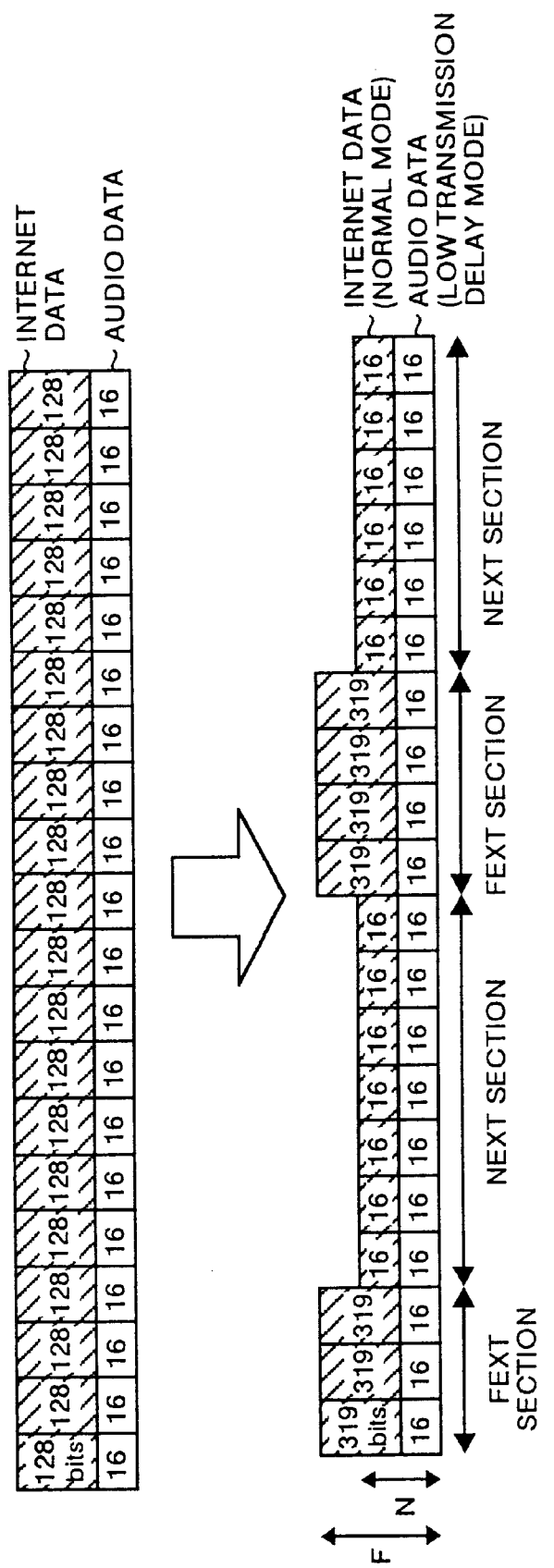
FIG. 11 is a diagram which explains the bit assignment of a communication system according to the present invention.

Thus, the Internet data using the interleaved data buffer route can be transmitted by being assigned to the unused portion of the bit map A.
In the case where (number $R_F$ of bits per symbol of the data using the fast data buffer route before rate conversion)< (maximum number N of bits that can be assumed in NEXT section) (see FIG. 11)

The maximum number F of bits that can be assumed in the FEXT section determined based on the S/N ratio measured during the training period is 384 bits, and the maximum number N of bits that can be assumed during the NEXT section is 32 bits. An explanation will be given below of an example of calculation in the case where the audio data of 64 kbps (corresponding to one telephone set of ISDN, for example) is transmitted through the fast data buffer route in low transmission delay mode, and the Internet data of 512 kbps (corresponding to one Internet access unit, for example) is transmitted through the interleaved data buffer route in normal mode.
(Number $R_F$ of bits per symbol of data using the fast data buffer route before rate conversion)

=(transmission rate)×(transmission time)/(total number of symbols, (except for ISS (inverse sync symbol) and SS (sync symbol))

=64 kbps×85 ms/340

=16 bits

Since the maximum number N of bits that can be assumed in the NEXT section is 32 bits, then $R_F$<N, and therefore, $F_f$=$N_f$=$R_F$ is satisfied. As a result, the audio data using the fast data buffer route can be transmitted at uniform rate, so that the delay can be suppressed and the transmission loss is avoided.

The Internet data using the interleaved data buffer route are assigned to the unused portion of the bit map A and the bit map B.

(Unused portion of bit map A)

=(maximum number $F$ of bits that can be assumed in FEXT section)−(number $F_f$ of bits per symbol in FEXT section of data using fast data buffer route)

=384−16

=368 bits (Unused portion of bit map B)

=(maximum number $N$ of bits that can be assumed in NEXT section)−(number $N_f$ of bits per symbol in NEXT section of data using fast data buffer route)

=32−16

=16 bits (Total unused portion of hyperframe)

=(unused portion of bit map $A$)×(number of symbols of bit map $A$)+(unused portion of bit map $B$)×(number of symbols of bit map $B$)

=368×126+16×214

=49792 bits

On the other hand, the number of bits required for transmitting the Internet data using the interleaved data buffer route by hyperframe (85 ms) is as follows.

(Number of bits required for transmitting Internet data by hyperframe using interleaved data buffer route)

=(transmission rate)×(transmission time)/(number of symbols of bit map $A$)

=512×85

43520 bits

Figure 12:
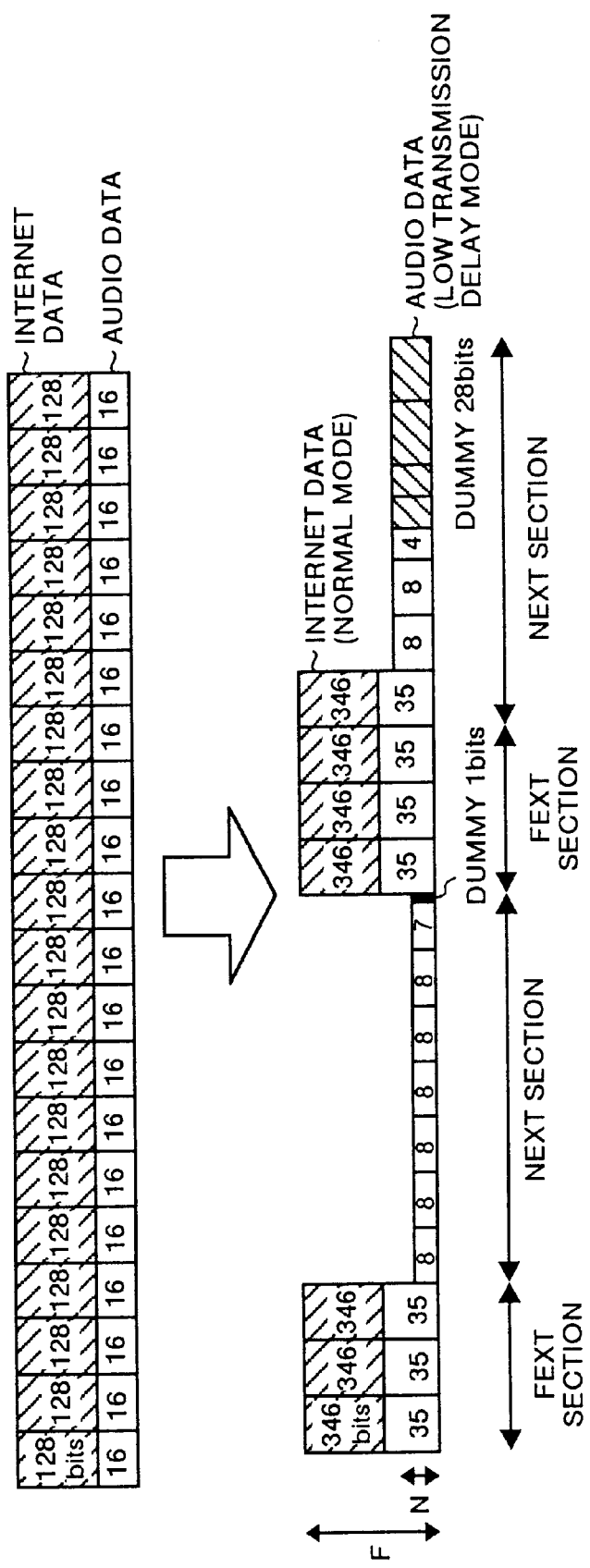
FIG. 12 is a diagram which explains the bit assignment of a communication system according to the present invention.

Thus, the Internet data using the interleaved data buffer route can be transmitted by being assigned to the unused portion of the bit map A and the bit map B.
In the case where (number $R_F$ of bits per symbol of the data using the fast data buffer route before rate conversion)> (maximum number N of bits that can be assumed in NEXT section) (see FIG. 12)

The maximum number F of bits that can be assumed in the FEXT section determined based on the S/N ratio measured during the training period is 384 bits, and the maximum number N of bits that can be assumed during the NEXT section is 8 bits. An explanation will be given below of an example of calculation in the case where the audio data of 64 kbps (corresponding to one telephone set of ISDN, for example) is transmitted through the fast data buffer route in low transmission delay mode, and the Internet data of 512 kbps (corresponding to one Internet access unit, for example) is transmitted through the interleaved data buffer route in normal mode.

(Number $R_F$ of bits per symbol of data using the fast data buffer route before rate conversion)

=(transmission rate)×(transmission time)/(total number of symbols, (except for ISS (inverse sync symbol) and SS (sync symbol))

=64 kbps×85 ms/340

=16 bits

Since the maximum number N of bits that can be assumed in the NEXT section is 8 bits, it becomes $R_F>N$, and therefore, $F_f=N_f=R_F$ does not consist. As a result, bits are assigned in such a manner that the audio data using the fast data buffer route of ten symbols are transmitted in the ratio of 3 symbols for the FEXT section (bit map A) and 7 symbols for the NEXT section (bit map B).

(Data using fast data buffer route for ten symbols)

=16 bits×10 symbols

=160 bits (Number of bits that can be transmitted bit map B for 7 symbols)

=(maximum number $N$ of bits that can be assumed in NEXT section)×7 symbols

=8 bits×7 symbols

=56 bits (Number of bits to be transmitted by bit map A)

((data using 10 symbol fast data buffer route)−(number of bits that can be transmitted in 7 symbol NEXT section))/3 symbols

=(160−56)/3

=34.66

Thus, the number of symbols in the FEXT section, i.e. the number of bits to be transmitted in the bit map A is assumed 35 bits. As a result, the audio data using the fast data buffer route corresponding to one period can be transmitted in the FEXT section and the NEXT section of one period, and therefore, the delay can be suppressed. Further, since the bits are assigned so as to reduce the difference between the number of bits assigned to the bit map A and the number of bits assigned to the bit map B, the delay can be suppressed.

Further, in view of the fact that all the bit map B are assigned to the audio data using the fast data buffer route, the Internet data using the interleaved data buffer route are assigned to the unused portion of the bit map A.

(Unused portion of bit map A)

=(maximum number $F$ of bits that can be assumed in FEXT section)−(number $F_f$ of bits per symbol in FEXT section of data using fast data buffer route)

=(maximum number $F$ that can be assumed in FEXT section)− (number of bits to be transmitted in bit map $A$)

=384−35

=349 bits

On the other hand, the number of bits required for transmitting the Internet data through the interleaved data buffer route using only the bit map A is as follows.

(Number of bits required for transmitting Internet data through interleaved data buffer route using only bit map A)

=(transmission rate)×(transmission time)/(number of symbols of bit map $A$)

=512×85/126

=346 bits

As a result, the Internet data using the interleaved data buffer route can be transmitted by being assigned to the unused portion of the bit map A.

In the case where the audio data and the Internet data in coexistence are transmitted in the manner described above, the low transmission delay mode and the normal mode are appropriately selected and bits of the audio data and the Internet data are distributed between them, and based on the particular bit distribution, the data are transmitted in multiplex fashion. Then, the audio data can be transmitted by a communication method small in transmission delay, and the Internet data can be transmitted by a communication method small in transmission loss. Therefore, it is thus making it possible to minimize the disadvantage of the transmission loss occurred in low transmission delay mode.

In the case where the STM (synchronous transfer mode) interface is included as a backbone of the network, the data are transmitted in order of the ADSL terminal equipment— the ADSL office equipment—the STM network—the ADSL office equipment—the ADSL terminal equipment.

Figure 13:
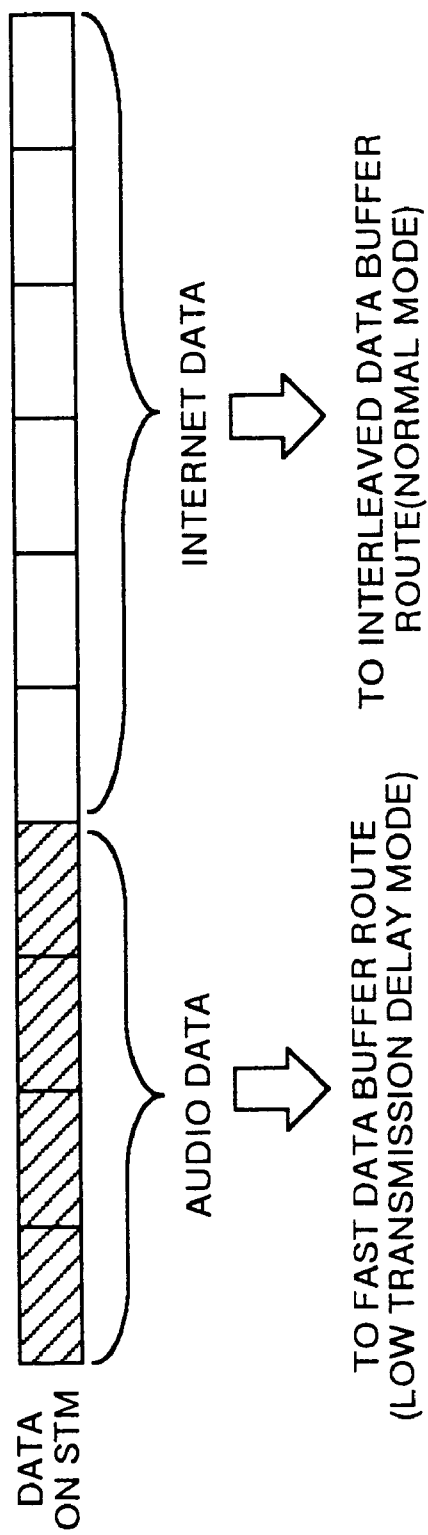
FIG. 13 is a diagram which explains the slot structure of the data transmitted and received between the ADSL office equipment according to the present invention.
Figure 14:
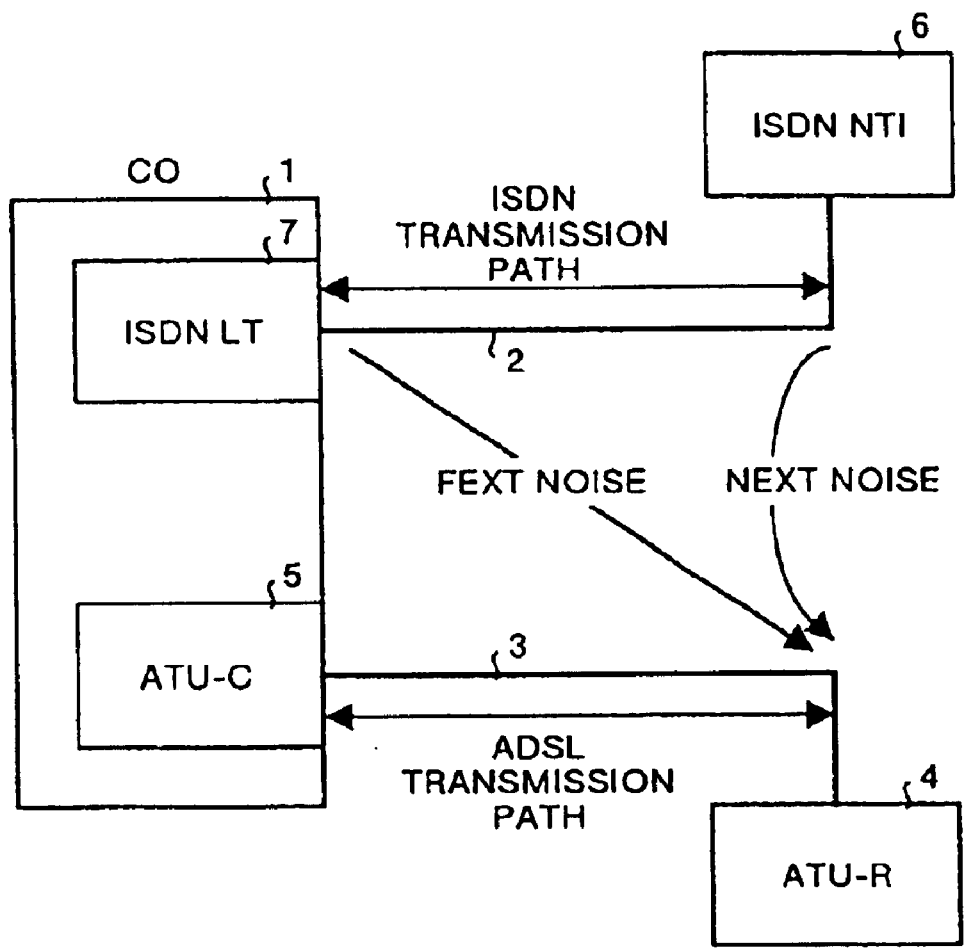
FIG. 14 is a diagram which explains the behavior of the interference noises between the transmission paths.

Between the ADSL office equipments through the STM network, as shown in FIG. 13, the data are supplied in time series in a ten-slot structure. The low transmission delay mode controllers 61 (FIG. 5), 161 (FIG. 6) have the function of controlling the transmission and receiving of these data, the function of synchronizing the timing and detecting the position thereof to predetermine the slots storing the audio data and the Internet data, respectively, and the function of selecting the data route based on the result of detection and controlling the particular route for low transmission delay mode or normal mode. The data transmission is thus controlled in accordance with the table prepared by the initialization process or the instruction from a high-level layer.

According to this embodiment, $m_{12}$, $m_{13}$ in the initialization table are used as a flag for selecting the low transmission delay mode or the normal mode. A similar effect can be obtained, however, by using the other portions. Further, a similar effect is achieved, even if the mode can be selected by other methods such as applying the flag to data.

In addition, this embodiment has been described with reference to the case in which a request for selecting the low transmission delay mode or the normal mode is received from a high-level layer. However, a similar effect can be attained by means of automatic selection in accordance with the type of data such as audio data or image data.

Further, the aforementioned embodiment has assumed the environment in which one ISDN telephone (64 kbps) or equivalent and one Internet access unit (512 kbps) are used at the same time. Other applications or use of other transmission rates can produce a similar effect.

In addition, in spite of the example described above in which the audio data are transmitted through the fast data buffer route and processed in low transmission delay mode, and the Internet data are transmitted through the interleaved data buffer route and processed in normal mode, the selection of the route and the processing mode according to the data type is not limited to the example shown above.

Furthermore, the functions described above with reference to the functional diagram can be realized either in H/W or in S/W.

In addition, in the explanation above, even in the case where the maximum number of bits that can be assumed in the NEXT section with a dual bit map is greater than the number of bits per symbol of the audio data before rate conversion, the audio data affected by the transmission delay are transmitted at the same data rate as before rate conversion. However, such audio data are not necessarily transmitted at the same data rate, a similar effect can be produced by assigning, for example, the number of bits greater than the number of bits per symbol before rate conversion to the FEXT section, and the Internet data to the portion of the FEXT section and the NEXT section which are not assigned the audio data for transmission. As another alternative, the audio data are entirely assigned to the FEXT section and the Internet data are assigned to the portion of the FEXT section and the NEXT section where the audio data are not assigned for transmission, thereby producing a similar effect.

As described above, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period not assigned the first data. Therefore, it is possible to suppress the transmission loss and the transmission delay.

Further, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data. Therefore, it is possible to suppress the transmission loss and the transmission delay.

In addition, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period which is not assigned the first data, such data are received of which the whole first data for one period are reproduced based on the first data assigned to the data transmission time for one period, and the whole second data for a predetermined period are reproduced based on the received second data assigned to the portion of the data transmission time of the predetermined period. Therefore, it is possible to suppress the transmission loss and the transmission delay.

Further, there is provided a communication system for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data, such data are received of which the whole first data for one period are reproduced based on the first data assigned to the data transmission time and the quasi-data transmission time for one period, and the whole second data for a predetermined period are reproduced based on the received second data assigned to the portion of the data transmission time and the quasi-data transmission time of the predetermined period. Therefore, it is possible to suppress the transmission loss and the transmission delay.

In addition, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period not assigned the first data. Therefore, it is possible to suppress the transmission loss and the transmission delay.

Further, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period not assigned the first data. Therefore, it is possible to suppress the transmission loss and the transmission delay.

In addition, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time of one period, and also in such a manner that the second data for a predetermined period can be transmitted in the portion of the data transmission time for the predetermined period which is not assigned the first data, such data are received of which the whole first data for one period are reproduced based on the first data assigned to the data transmission time for one period, and the whole second data for a predetermined period are reproduced based on the received second data assigned to the portion of the data transmission time of the predetermined period. Therefore, it is possible to suppress the transmission loss and the transmission delay.

Further, there is provided a communication method for setting in one period the data transmission time suitable for data transmission and the quasi-data transmission time other than the data transmission time in accordance with the transmission path, and communicating by multiplexing first data and second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period which is not assigned the first data, such data are received of which the whole first data for one period are reproduced based on the first data assigned to the data transmission time and the quasi-data transmission time for one period, and the whole second data for a predetermined period are reproduced based on the received second data assigned to the portion of the data transmission time and the quasi-data transmission time of the predetermined period. Therefore, it is possible to suppress the transmission loss and the transmission delay.

INDUSTRIAL APPLICABILITY

As described above, a communication system and a communication method according to the present invention are suitable for the data communication performed between a plurality of data communication units through a telephone line by, for example, the DMT modem scheme.

What is claimed is:

1. A communication system which sets in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time of one period, and also in such a manner that the second data for a predetermined period can be transmitted in the portion of the data transmission time for the predetermined period not assigned to the first data, and wherein said data transmission time is a far end cross talk section and said quasi-data transmission time is a near end cross talk section.

2. A communication system for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period to which the first data has not been assigned, and wherein said data transmission time is a far end cross talk section and said quasi-data transmission time is a near end cross talk section.

3. A communication system for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time of one period, and also in such a manner that the second data for a predetermined period can be transmitted in the portion of the data transmission time for the predetermined period to which the first data has not been assigned, such data are received of which the whole first data for one period are reproduced based on the first data assigned to the data transmission time for one period, and the whole second data for a predetermined period are reproduced based on the received second data assigned to the portion of the data transmission time of the predetermined period, and wherein said data transmission time is a far end cross talk section and said quasi-data transmission time is a near end cross talk section.

4. A communication system for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period to which the first data has not been assigned, such data are received of which the whole first data for one period are reproduced based on the first data assigned to the data transmission time and the quasi-data transmission time for one period, and the whole second data for a predetermined period are reproduced based on the received second data assigned to the portion of the data transmission time and the quasi-data transmission time of the predetermined period.

5. A communication method for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time of one period, and also in such a manner that the second data for a predetermined period can be transmitted in the portion of the data transmission time for the predetermined period not assigned the first data, and wherein said data transmission time is a far end cross talk section and said quasi-data transmission time is a near end cross talk section.

6. A communication method for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period to which the first data has not been assigned, and wherein said data transmission time is a far end cross talk section and said quasi-data transmission time is a near end cross talk section.

7. A communication method for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time of one period, and also in such a manner that the second data for a predetermined period can be transmitted in the portion of the data transmission time for the predetermined period to which the first data has not been assigned, such data are received of which the whole first data for one period are reproduced based on the first data assigned to the data transmission time for one period, and the whole second data for a predetermined period are reproduced based on the received second data assigned to the portion of the data transmission time of the predetermined period, and wherein said data transmission time is a far end cross talk section and said quasi-data transmission time is a near end cross talk section.

8. A communication method for setting in one period a data transmission time suitable for data transmission and a quasi-data transmission time other than the data transmission time in accordance with a transmission path, and communicating by multiplexing a first data and a second data, wherein bits are assigned in such a manner that the first data for one period can be transmitted during the data transmission time and the quasi-data transmission time of one period, and also in such a manner that the second data for a predetermined period can be transmitted in the portion of the data transmission time and the quasi-data transmission time for the predetermined period to which the first data has not been assigned, such data are received of which the whole first data for one period are reproduced based on the first data assigned to the data transmission time and the quasi-data transmission time for one period, and the whole second data for a predetermined period are reproduced based on the received second data assigned to the portion of the data transmission time and the quasi-data transmission time of the predetermined period.

9. A communication system for multiplexing and communicating transmission data, said system comprising:

a low transmission delay mode controller for selecting a transmission path and for selecting a mode of transmission for said transmission data, wherein said mode of transmission includes a low transmission delay mode and a normal mode, wherein said low transmission delay mode distributes bits of a first data and a second data, during a period having a far end cross talk section and a near end cross talk section, wherein bits of said first data are assigned to said far end cross talk section and bits of said second data are assigned to said far end cross talk section which is not occupied by bits of said first data.

10. The communication system according to claim 9, wherein dummy bits are assigned to said data transmission section and said quasi data transmission section where said first and second data are not assigned.

11. The communication system according to claim 9, wherein said transmission path includes a fast data buffer route and an interleaved data buffer route.

12. A communication system for multiplexing and communicating transmission data, said system comprising:

a low transmission delay mode controller for selecting a transmission path and for selecting a mode of transmission for said transmission data, wherein said mode of transmission includes a low transmission delay mode and a normal mode, wherein said normal mode distributes bits of a first data and a second data, during a period having a far end cross talk section and a near end cross talk section, wherein bits of said first data are assigned to said far end cross talk section and said near end cross talk section, and wherein bits of said second data are assigned to said far end cross talk section and said near end cross talk section, which are not occupied by bits of said first data.

13. The communication system according to claim 12, wherein dummy bits are assigned to said data transmission section and said quasi data transmission section where said first and second data was not assigned.

14. The communication system according to claim 12, wherein said transmission path includes a fast data buffer route and an interleaved data buffer route.

15. A controller for communicating transmission data under FEXT (far end cross talk) noise and NEXT (near end cross talk) noise, comprising:

a rate converter that receives fast data via a fast data buffer route and interleaved data via an interleaved data route, said fast data buffer route providing lower latency than said interleaved data buffer, and assigns bits of the fast data to a FEXT section of a transmission period and bits of the interleaved data to said FEXT section which is not occupied by bits of said fast data.

16. The controller for communicating transmission data under FEXT noise and NEXT noise according to claim 15, wherein said rate converter assigns bits of fast data to a NEXT section of the transmission period and bits of the interleaved data to the NEXT section which is not occupied by bits of said fast data.

17. The controller for communicating transmission data under FEXT noise and NEXT noise according to claim 15, wherein said rate converter assigns bits of fast data to the FEXT section and a NEXT section of the transmission period and bits of the interleaved data to the FEXT section which is not occupied by bits of said fast data.

18. The controller for communicating transmission data under FEXT noise and NEXT noise according to claim 15, further comprising:

a multiplex controller that selects a data route from the fast data route and the interleaved data route for the transmission data and sends the transmission data to said rate converter via the selected data route; and an interleaver that interleaves said interleaved data for said fast buffer route.

19. The controller for communicating transmission data under FEXT noise and NEXT noise according to claim 15, wherein said rate converter calculates a number of bits for the interleaved data by subtracting a number of bits occupied by the fast data from number of bits in the FEXT section.

\* \* \* \* \*